United States Patent
Kamiya et al.

[11] Patent Number: 5,614,898
[45] Date of Patent: Mar. 25, 1997

[54] GUIDE SYSTEM

[75] Inventors: Kazuo Kamiya, Anjo; Hirofumi Morimoto, Nishio; Shoji Yokoyama, Anjo, all of Japan

[73] Assignee: Aisin AW Co., Ltd., Japan

[21] Appl. No.: 405,886

[22] Filed: Mar. 17, 1995

[30] Foreign Application Priority Data

| Mar. 18, 1994 | [JP] | Japan | 6-049235 |
| Mar. 18, 1994 | [JP] | Japan | 6-049236 |
| May 2, 1994 | [JP] | Japan | 6-093464 |
| May 2, 1994 | [JP] | Japan | 6-093465 |
| Dec. 26, 1994 | [JP] | Japan | 6-322022 |

[51] Int. Cl.$^6$ .................................. G08G 1/123
[52] U.S. Cl. ................. 340/995; 340/988; 340/990; 364/443; 364/444; 364/449.1; 73/178 R
[58] Field of Search .................. 340/995, 990, 340/988; 364/449, 444, 443; 73/178 R

[56] References Cited

U.S. PATENT DOCUMENTS

| 4,630,209 | 12/1986 | Saito et al. | 340/995 |
| 4,761,742 | 8/1988 | Hanabusa et al. | 340/988 |
| 4,812,845 | 3/1989 | Yamada et al. | 340/988 |
| 4,951,211 | 8/1990 | De Villeroche | 340/995 |
| 5,293,163 | 3/1994 | Kakihara et al. | 340/988 |
| 5,412,573 | 5/1995 | Barnea et al. | 340/990 |
| 5,442,557 | 8/1995 | Kaneko | 340/990 |

OTHER PUBLICATIONS

Applicant's Specification, p. 1, line 16 to p. 2, line 17.

*Primary Examiner*—Jeffery A. Hofsass
*Assistant Examiner*—Benjamin C. Lee
*Attorney, Agent, or Firm*—Lorusso & Loud

[57] ABSTRACT

A guide system for a vehicle includes guide data storage containing guide data for conversion into output information concerning guidance objects along roads to be travelled by the vehicle and in the general area thereof. A TV monitor and microphone serve to output the information. A present position detector detects the present position which is traced on a map display output on the TV monitor. A first search routine searches over a first area range for guidance objects on the basis of the detected present position and a second search routine searches for guidance objects over a second area range different from the first area range. Once a guidance object is located, the guide data for that located guidance object is read out from the guide data storage and converted into output information. A manual key is provided on a remote controller for switching to the second search routine.

12 Claims, 18 Drawing Sheets

GUIDE SYSTEM

BACKGROUND OF THE INVENTION

1. Field of the Invention

The present invention relates to a guide system for tracing a present position of a vehicle to guide sight-seeing in the vicinity of a road being followed by the vehicle.

2. Related Art

There have been proposed a variety of navigation systems which are able to select an optimum route and guide travel to a destination by designating a starting point (or present point) and a destination. In the navigation systems proposed in the prior art, the course guidance is carried out exclusively by instructing rightward or leftward turns and/or the direction of advance with respect to intersections or landmarks.

In Japanese Patent Laid-Open No. 290473/1986, Japanese Patent Publication No. 19005/1988 and Japanese Patent Laid-Open No. 1520/1992, for example, there are proposed systems, in which storage means is provided for storing the sight-seeing information and in which the present position of the vehicle is detected and displayed on a map display, together with indication of the running direction, while the sight-seeing information is additionally output in voice.

In the guide systems of the prior art described above, however, a search may be conducted outward from the detected present position to locate an object of sight-seeing interest which exists near the present position or on the road ahead. However, with such systems it is impossible to provide guidance for objects other than those which face the road. It is also impossible to provide guidance for objects which are present near the road being or to be followed. Especially, an interesting and important "guidance object" (i.e., object to be covered by output of guidance information) not facing the road cannot be treated, even if present in the neighborhood of the present position or road ahead, because it cannot satisfy the conditions for guidance.

SUMMARY OF THE INVENTION

The present invention has as its objectives solution of above problems and provision of a guide system capable of providing guidance, e.g. sight-seeing information, even for objects which do not face the road.

Accordingly, the present invention provides a guide system comprising: guide data storage means stored with guide data for providing guidance information for objects along a road to be travelled and in the area thereof; guidance output means for outputting guidance information for object(s) located by search; present position detecting means for detecting and tracing a present position; and guide output means including first search means for locating object(s) within a first search range, on the basis of the present position obtained by the present position detecting means, and second search means for locating object(s) within a second search range different from and larger than (encompassing) said first search range. The guide output means reads guide data from the guide data storage means and outputs information for the object(s) located by the first and second search means. A manual key is provided for commanding a search by the second search means, whereby the guide output means locates guidance object(s) by the second search means instead of by the first search means, responsive to operation of the manual key. Thus, the object(s) (hereinafter "guidance object") is searched for by the first search means, if the manual key is not operated, or by the second search means which searches for the guidance object within a range different from that covered by the first search means, if the manual key is operated. As a result, guidance objects, which were not located by the first search means, can be located and guidance information therefor output.

By setting an order of selection for guidance objects, the guidance information can be output sequentially beginning with objects closest to the present position or having a higher priority assigned for their guide data, such order and priority being set in advance individually for the guidance objects, so that a desired guidance object can be easily selected and output with reference to a priority list.

DESCRIPTION OF THE PREFERRED EMBODIMENTS

As used herein the terminology "shown object" means an object for which guidance (sight-seeing) information has already been provided and the terminology "guidance object" refers to an object which is to become the subject of guidance information.

Figure 1:
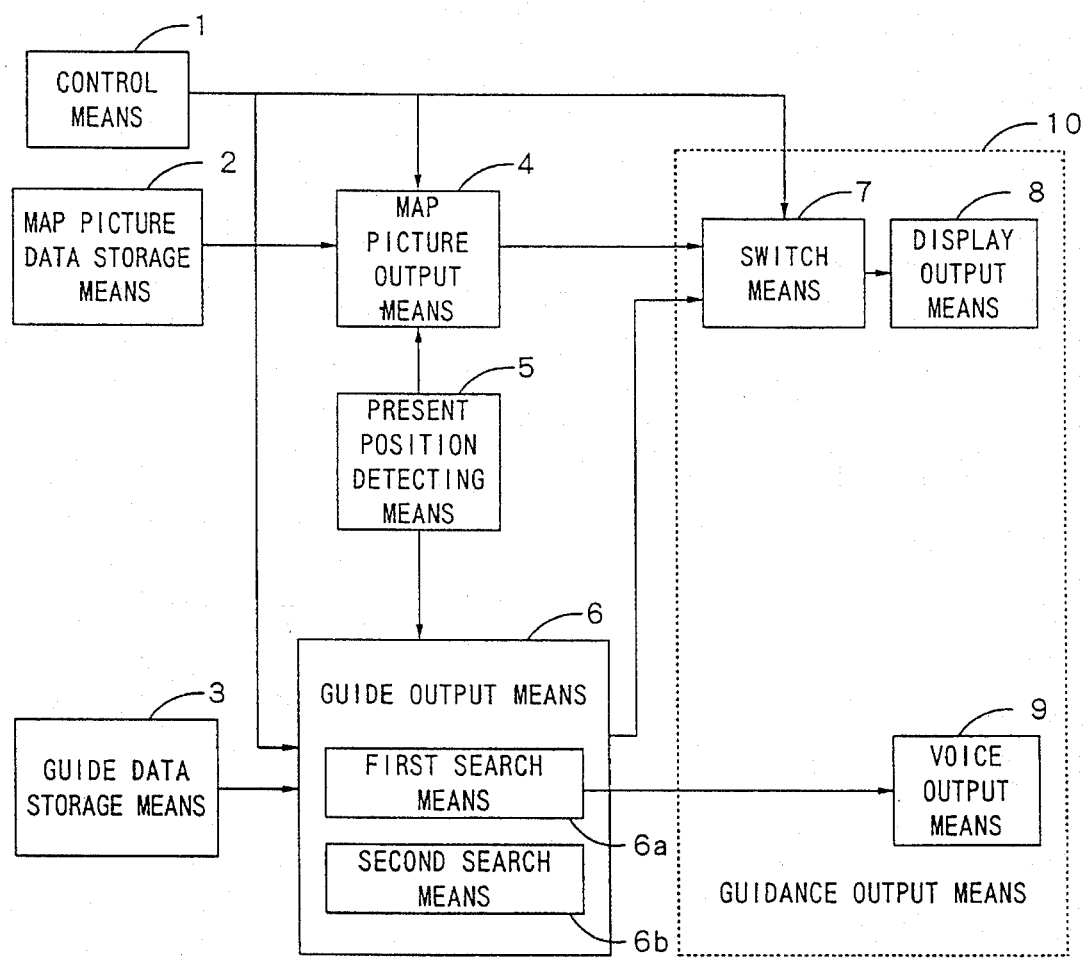
FIG. 1 is a block diagram showing one embodiment of a guide system according to the present invention.
Figure 13:
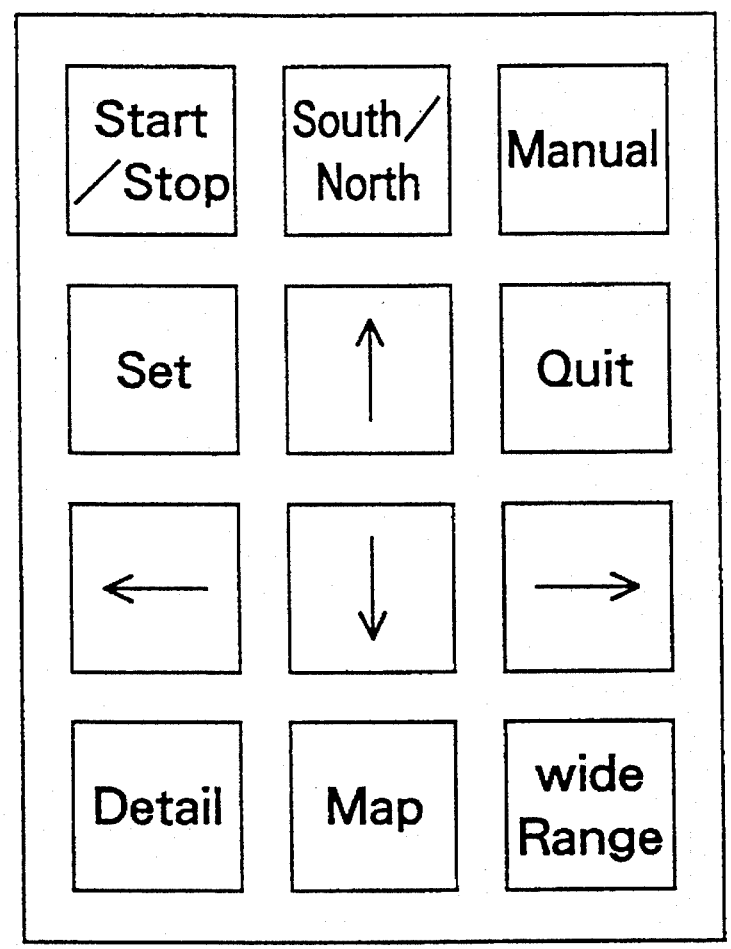
FIG. 13 is a diagram showing an example of a remote control unit with keys which may be used as control means in the present invention.

In FIG. 1, control means 1 is exemplified by a remote control unit having a variety of control keys, as shown in FIG. 13, for switching the map picture, which is displayed in display output means 8, between a detailed picture and a wide range picture, for inverting the display azimuth, for example, changing a north upward display to south upward, and for switching a displayed guide picture into a map picture. Thus, the display output means 8 is used to display and output the guidance information for an object and map pictures, and voice output means 9 for output voice guidance for the object. Map picture data storage means 2 is used to store the roads divided by grids and the map picture data for the guidance object, and guide data storage means 3 is used to store the guide data for the objects along the roads, the streets, and the pictures and voices for providing guidance information. Moreover, the guide data for each object may be divided into a plurality of short guide units (or phrases) which are assigned a priority. Present position detecting means 5 is used detect and trace the north latitude and east longitude of the vehicle and the present position relative to the road travelled, the azimuth for advance, the vehicle speed and so on by using a GPS (i.e., Global Positioning System) receiver, a vehicle speed sensor, a steering angle sensor, a gyro sensor and/or an earth magnetism sensor. Map picture output means 4 reads the map picture data for the vicinity of the present position from the map picture data storage means, outputs display signals for the map picture and the direction of advance. Guide output means 6 is composed of first search means 6a and second search means 6b having different search ranges, which are switched and used according to the manual key operations of the control means 1. The guide output means 6 searches for and locates the guidance object on the basis of the information of the present position, the advancing direction, the vehicle speed and/or the road and reads out the guide data from the guide data storage means 3 thereby to convert the guide data into the picture signals and voice signals and outputs the latter as guidance. If, during the guidance processing for one object, data for the next object in succession is extracted, the current guidance may be terminated at the end of the current guide unit, and the guidance for the next object may be started. If the next guidance object is then extracted, the two objects are compared in terms of their preassigned priorities, and the guidance for the next guidance object is started, with registration of the previous (off-going) guidance object so as to prevent repetition of guidance output for the same guided object, provided the next guidance object has a higher priority. Switch means 7 is used to switch the display output of the display output means 8 between the map picture generated by the map picture output means 4 and the guide picture generated by the guide output means 6. When a guidance object is located for start of guidance with respect to that located object, while the vehicle is running with display of the present position and indication of the direction of advance on the map picture, the display signals of the map picture are switched to the picture signals for guidance by the guide output means 6. This automatic switching can be overridden by operation of the map display keys of the control means 1, to switch back from the guide picture to the map picture. Guidance output means 10 includes the switch means 7, the display output means 8 and the voice output means 9.

The guide system of the present invention is energized by ACC-ON to display a title picture on the display output means and is deenergized by ACC-OFF. If, moreover, the CD-ROM having the program stored therein is in place when the power is turned on, the program is started. If the CD-ROM is inserted after the power is turned ON, the program is started by the operation of the control means 1. When the guide program is started, the present position is sequentially detected and traced as the vehicle runs, so that the map picture, with north upward, displays the present position at the center with an arrow indicating the direction of advance on the display output means 8.

The guidance objects are classified as: point objects such as facilities, buildings and monuments; linear objects such as bridges, streets, lakes or large facilities; and zone objects such as national parks, plains or areas. Start of guidance for a point object is restricted in timing, but start of guidance for a linear object or a zone object can be selected within a considerable range. In terms of priority, a linear object is preferred over a zone object, and a point object is preferred over a linear object. For example, the priority may be set such that a linear object or zone object is searched in the database and extracted when no point object can be located for guidance, or such that a linear object is not searched before searching for point object whereas the zone object is not searched before searching for a linear object.

Figure 2A:
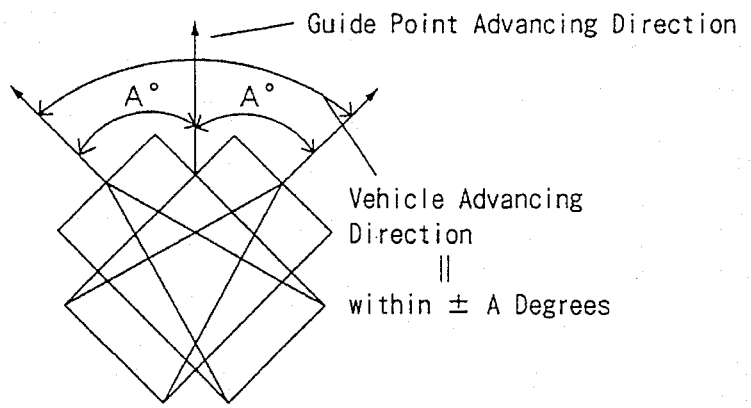
FIGS. 2a, 2b and 2c are diagrams explaining conditions to be satisfied prior to start of guidance.
Figure 2B:
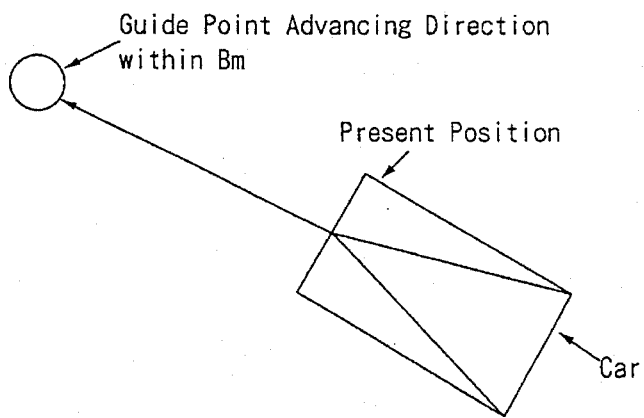
Figure 2C:
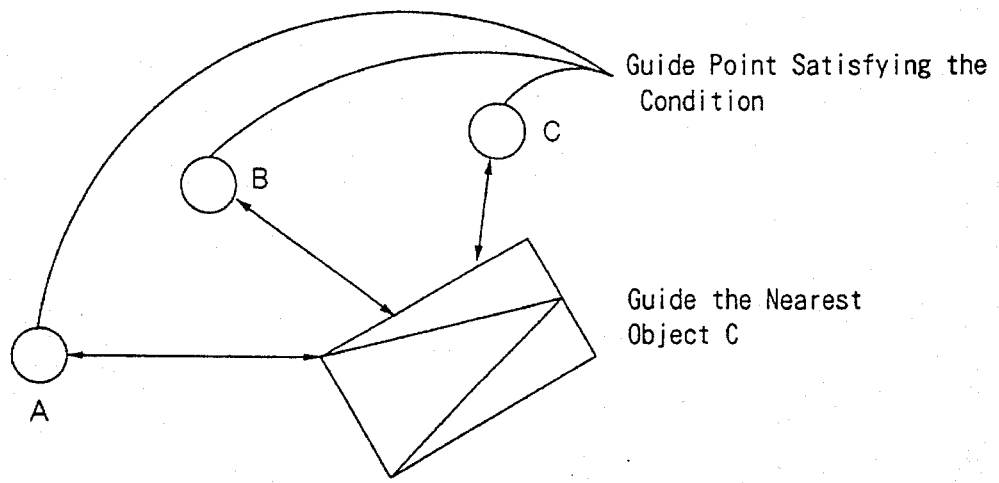

The guidance is accomplished in the following manner. A guidance object is identified by search of data stored in the guide data storage means 3 and data therefor is extracted, on basis of the detected present position, the direction of advance and the vehicle speed, by the first search means 6a of the guide output means 6, and is automatically output as picture and voice by the guide output means 6 as the identified guidance object is approached by the vehicle, provided information for that identified guidance object has not yet been output and further provided that there is no current output of information for another guidance object. This search covers a geographical area defined as ±A degrees of the vehicle advancing direction with an apex at the present position, as shown in FIG. 2(a), and limited to guidance starting points within B m from the detected vehicle present position, with the value for B varying with the vehicle speed, as shown in FIG. 2(b). Alternatively, by operation of the control means 1, the first search means 6a may be rendered inoperative and replaced by operation of second search means 6b for the search to identify a guidance object. As shown in FIG. 2(c), second search means 6b searches for an object which is positioned in an expanded search range within ±A' degrees of the vehicle advancing direction with respect to the guidance starting point advancing direction and in which the vehicle position is within B' m from the guidance starting point coordinates with the vehicle speed being considered: A' degrees>A degrees; and B'>B). Thus, a guidance object near the present position (of the vehicle), may be identified and data therefor extracted so that guidance may be provided for the identified objects in sequence beginning with the one closest to the present position. Alternatively, the objects may be given priority with guidance provided in sequence, beginning with that identified guidance object having the highest priority.

In order that guidance will always start from the same guidance starting point on the map, the CD-ROM for reading out the guide data on the map must be started further from the guidance starting point as the vehicle speed increases. Accordingly, as the vehicle speed increases, for the same guide output time period, the guide output distance becomes correspondingly longer. If, therefore, the guidance output is to be centered on the guidance object which is the subject of that guidance, the guidance starting point must be shifted forward as the vehicle speed increases. In order to read out the guide data with assurance that the guidance will start at a desired guidance starting point even at a higher vehicle speed, it is necessary to set a time period t (which is the CD running time from the position of the present pickup on the CD and to the position of the data for the guidance object on the CD) for each guidance object from the start of the CD-ROM to the reading of the guide data therefor. This time period t can be converted into a distance $s=K \cdot v \cdot t$ (wherein K is a constant), corresponding to the speed v of the vehicle. For the CD reading starting position, therefore, the guide data can be reliably read out in advance of the guidance starting point by locating the CD reading starting position on the map from that distance s and the guidance starting point.

In general, the condition for ending the guidance is output of the last guide data. However, this guidance may be terminated after completion of the current guide unit, either by operation of the guidance quitting switch on control means 1 or by arrival at the guide point for another identified guidance object. If, moreover, a comparison of priority of the current guide unit with that of the leading guide unit for another identified guidance object reveals that the latter guidance object has a higher priority, the current guidance can also be terminated with completion of the current guide unit. In short, the guide data is divided into a plurality of guide units, each composed of one picture sheet and corresponding vocal commentary of several seconds, for example, so that the starting and termination of the guidance are decided in terms of guide units. By setting priority, moreover, in case a plurality of guidance objects satisfying the guidance starting conditions, the selection of the guide unit to be executed, the adjustment of the length of guidance (number of guide units) and the termination of the guidance may be determined on the basis of the set priority.

Figure 3:
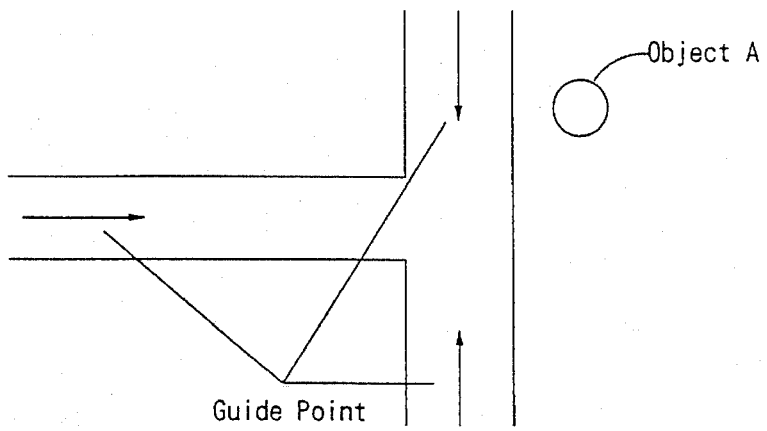
FIG. 3 is a diagram illustrating a guide point for one guidance object.
Figure 4:
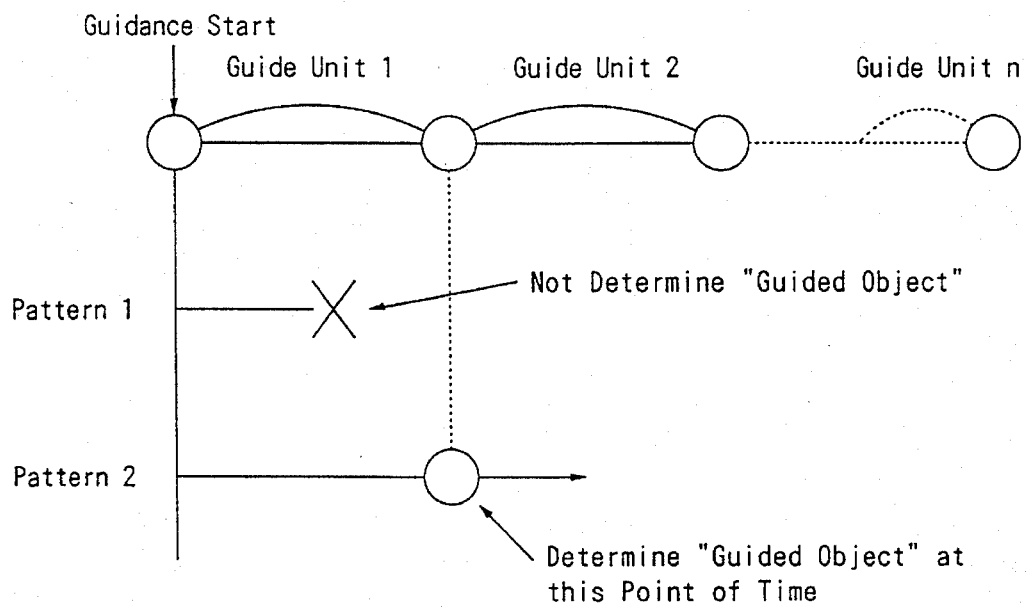
FIG. 4 is a diagram illustrating the flagging of a guidance object as a "shown object" (i.e., an object for which guidance information has already been provided)

A plurality of guide points are given for each guidance object, e.g. the three guide points identified by coordinates for east longitude and north latitude and the vehicle advancing direction are given in the vicinity of a T-shaped road, as shown in FIG. 3. Moreover, after a guidance object has been covered by guidance commentary, it is flagged in memory (storage means 3) as having been covered in order to avoid repetition. For example, as shown in FIG. 4, the guidance object for which one or more guide units have been output, may be flagged as a shown object. Alternatively, the object may be flagged as shown either on the basis that all guide units therefor have been presented or on the basis that a predetermined guide unit having a high priority has been presented.

Figure 5:
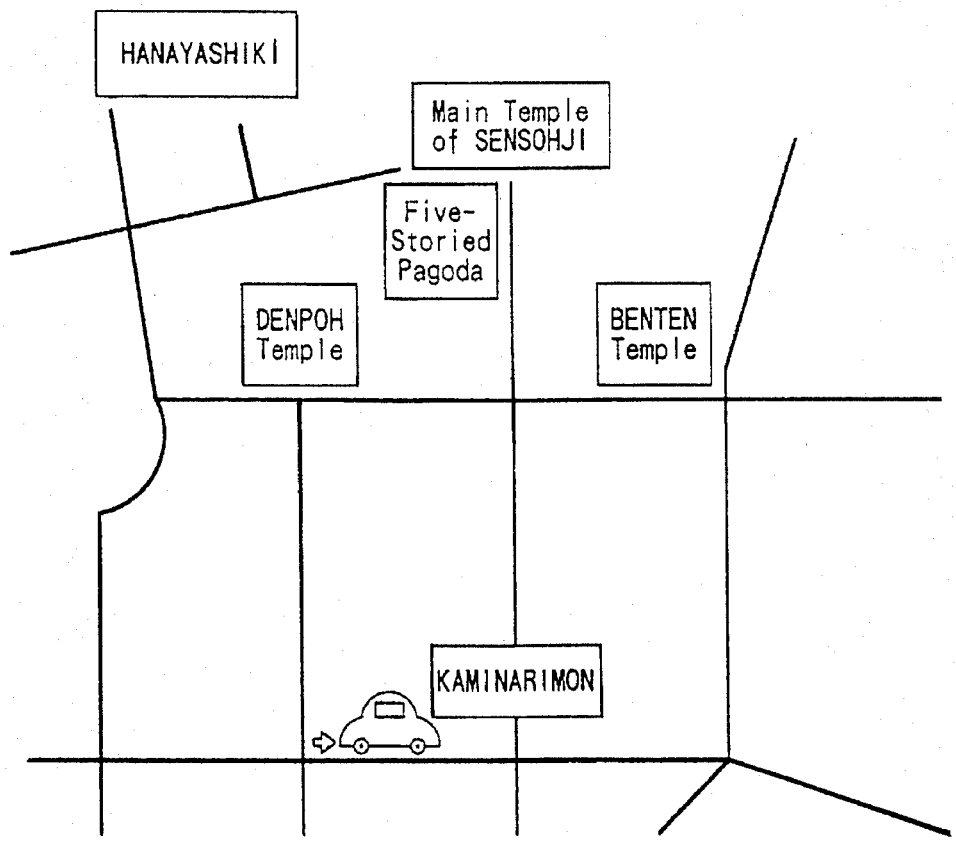
FIG. 5 is a diagram illustrating examples of guidance objects.
Figure 5:
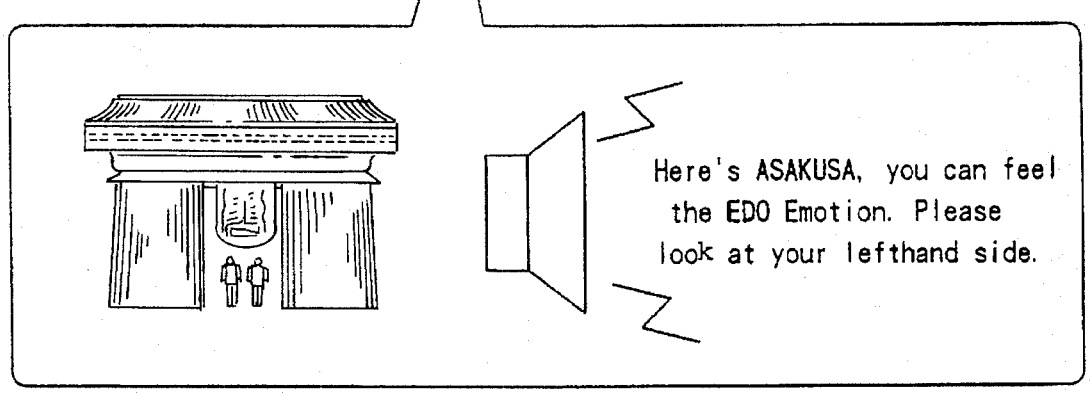

Here will be briefly described a specific example of output of guidance information. The situation in which a vehicle is passing near KAMINARIMON of ASAKUSA, is shown in FIG. 5. Assuming KAMINARIMON has been designated beforehand as a guidance object, the picture and voice data for KAMINARIMON, are stored in the guide data storage means 3. Thus, the guide output means 6 extracts the data, which satisfies the aforementioned guidance starting condition, from the guide data storage means 3 on the basis of the present position, advancing direction and speed of the vehicle, which are obtained from the present position detecting means 5. When KAMINARIMON is identified as the guidance object, the guide data of the guide picture and voice data for KAMINARIMON are read out and are converted and output as the individual signals. When the guide picture signal is output, the switch means 7 switches from the display signal of the map picture generated by the map picture output means 4 to the guide picture signal. As a result, the display output means 8 outputs the shown guide picture, and the voice output means 9 outputs a guide voice "—EDO Emotion—". After this guidance ends, the guide output means 6 flags KAMINARIMON as a shown object so that repetition of guidance can be prevented even if KAMINARIMON is passed again in a different direction.

If, however, the guidance is executed merely by searching for an object on the basis of the present position, as shown in FIG. 5, what is output is the picture and voice guidance for KAMINARIMON as the vehicle passes in a straight path from the left to the right in FIG. 5. The search area for the vicinity of KAMINARIMON is not so wide as to include, not only the Main Temple of SENSOHJI, Five-Storied Pagoda, DENPOH Temple, BENTEN Temple and HANA-YASHIKI, but also objects which are located out of sight from the road being followed. In case, therefore, guidance information is desired for an important object (having a high priority) around the present position, the manual key of the control means 1 is operated, and the guide data output means 6 then extracts data for an object near the present position and outputs guidance information for that object. In the case where a plurality of objects are so identified, they may be listed on the display screen so that either a desired one may be output selectively or the objects may be presented in order beginning with that closest to the present position. Alternatively, a first object near the present position is first presented, and then an object near the first object is presented, or the individual objects are given priority in advance so that they may be output in the order of their preassigned priorities. Moreover, guide sentences are divided into guide units of proper expressions, for example: "Please look at your righthand side—", in case of an object facing the road being followed has been automatically located by search based on the present position and guidance information therefor is being output; and "Far at your righthand side—" or "Near at your righthand side—", in case of an object out of sight from the road being followed is to be covered responsive to manual input.

Moreover, once object guidance is started, it may happen that the present position of the vehicle, the position of the object, and the circumstance of the object are unknown. In this case, according to the present invention, the map key may be operated by the control means 1 to instruct switching to the map picture. Then, the switch means 7 switches from the guide picture signals generated by the guide output means 6 to the display signals of the map picture generated by the map picture output means 4, so that the map picture, as shown in FIG. 5, can be displayed. In the meanwhile, the voice guidance can be output but may be interrupted. Thus, switching to the map picture may be made at any time after the start of object guidance so that map information showing the position and surroundings of the object can be presented.

Here will be described a specific example of the guide output means.

Figure 6:
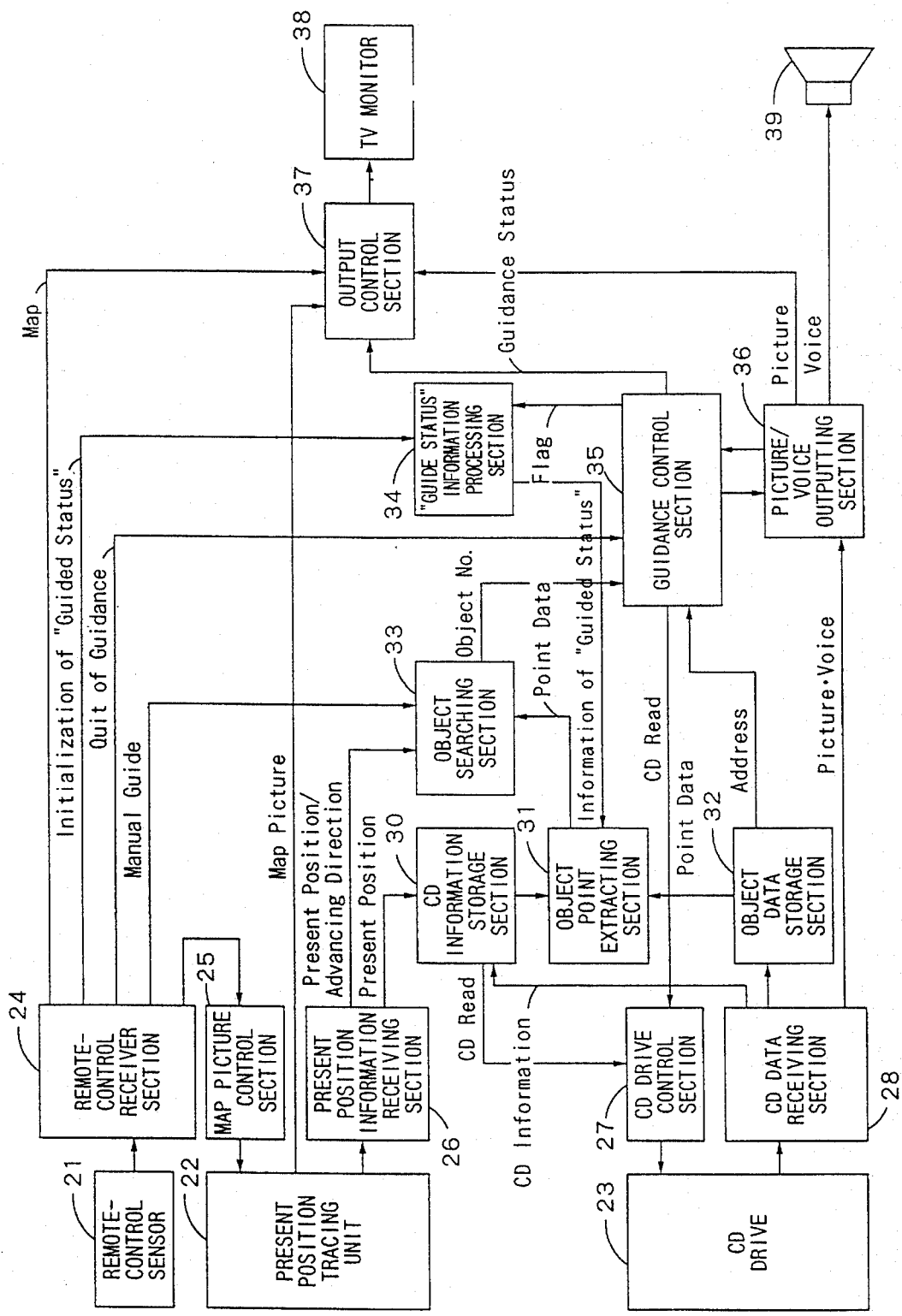
FIG. 6 is a block diagram of the system hardware of one embodiment, especially its guide output means.

In FIG. 6, a remote-control sensor 21 receives the various control signals for starting/stopping operations, which are transmitted by a wireless remote control using optical signals, for example, and converts those control signals into electric signals. The signals for controlling by remote control are exemplified by a "guided status" initializing instruction, a guidance quitting instruction, a manual guide instruction, a present position map picture control instruction or a map instruction. A remote-control receiver section 24 decodes the control signals received from the remote-control sensor 21, into key codes, and feeds the "guided status" initializing instruction to a "guided status" information processing section 34, the guidance quitting instruction to a guidance control section 35, the manual guide instruction to an object searching section 33, the present position map picture control instruction to a map picture control section 25, and the map instruction to an output control section 37. The map picture control section 25 converts the map picture control instruction, which was generated by the remote-control sensor 21 and received by the remote-control receiver section 24, into a communication format and feeds the formatted signals to a present position tracing unit 22. In accordance with the map picture control instruction, the map picture control section 25 changes the scale of (e.g., reduces or enlarges) the map picture to be displayed on a TV monitor 38, and changes the direction (i.e., the north and south) of the orientation of the display.

The present position tracing unit 22 detects and traces the present position of the vehicle and is equipped with the GPS, the vehicle speed sensor, the map data and so on, so that it detects and traces the present position by its east longitude and north latitude coordinates, the present road being followed, the running direction (or advancing direction), and the vehicle speed to thereby provide not only these data but also the map picture data of predetermined azimuth and scale for the vicinity around the present position. Hence, the navigation system of the prior art may be used as is for the present position tracing unit 22. A present position information receiving section 26 extracts the present position information, which is received from the present position tracing unit 22, and feeds the present position and the followed road to a CD information storage section 30 and the present position, the advancing direction and the running speed to the object searching section 33.

A CD drive 23 reads one a plurality of guiding CDs stored with the guide information. The reading of the data from the CD is carried out: ① by rotating the CD by a predetermined number of turns; ② by moving the pickup to an address for reading out the data; and ③ by reading the data. These operation commands ① to ③ are independent of one another and are issued, as required, to the CD drive 23. These operations ① to ③ are executed with a view toward improving the durability and reducing the power consumption of the CD drive. A CD drive control section 27 processes the control information for controlling the reading of the guidance CD by the CD drive 23 on the basis of the CD-reading instruction coming from the CD information storage section or the guidance control section 35, to thereby instruct the CD drive 23. A CD data receiving section 28 receives the CD data, which is read out in accordance with the reading control information, and feeds the CD information to the CD information storage section 30, the object data to an object data storage section 32, and the compressed picture and voice guidance data to the picture/voice outputting section.

The CD information storage section 30 issues read instructions for the individual items of guidance information and stores the CD information which is composed of the disc label for each guiding CD, the guidance object file and the guide point file. The CD information storage section 30 further issues the read instruction to read object data for the vicinity of the present position from the stored CD information and present position, and feeds an object point extracting section 31 with a range of coordinates for extracting the object point data.

The object data storage section 32 stores the object data, i.e. CD data received by the CD data receiving section 28, for extraction by the point object extracting section 31, and the object address is fed to the guidance control section 35. The object point extracting section 31 extracts that point object data relating to the vicinity of the present position from among the point object data stored in the object data storage section 32, while masking out the "shown status" information. The object searching section 33 searches to identify an object No. from among the point object data, in terms of the present position, the direction of advance of the vehicle or the manual instruction.

The guidance control section 35 controls the guidance responsive to the guidance termination instructions from the remote-control receiving section 24 and object No. information from the object searching section 33. The guidance control section 35 selects the object address having the object No., which is searched by the object searching section 33, from the object address which is stored in the object data storage section 32, and sends a CD read instruction to the CD drive control section 27, a guide instruction (to start or quit the guidance) to picture/voice outputting section 36, and the guiding status of the picture/voice outputting section 36 to the output control section 37. Moreover, the guidance control section 35 sends a status flag signal to the "guided status" information processing section 34. This "guided status" information processing section 34 sets the "guided status" ("shown status") flag, as instructed by the guidance control section 35, which flag is maintained until initialized by the "guided status" initializing instruction of the remote-control receiving section 24, and feeds the status information to the point object extracting section 31.

The picture/voice outputting section 36 decodes the guiding code data received through the CD data receiving section 28, to provide the guide picture to be output by the TV monitor 38 and the guide voice to be output by a speaker 39. The decoded signals are fed individually through the output control section 37 to the TV monitor and to the speaker 39. For the TV monitor 38, the output control section 37 switches between the map picture sent from the present position tracing unit 22 and the guide picture sent from the picture/voice outputting section 36 responsive to the guiding status signal input from the guidance control section 35 and the map switching signal from the remote-control receiving section 24. In order that guidance for any object may not be repeated, the status flag is set for the "shown object" to thereby skip over the "shown object" when a "guidance object" is to be searched.

As described above, in FIG. 6, the remote-control sensor 21, the remote-control receiving section 24 and the map picture control section 25 constitute the control means 1 of FIG. 1, and the present position tracing unit 22 constitutes the map picture data storage means 2, the present position detecting means 5 and the map picture output means 4 of FIG. 1. Moreover, the CD drive 23, the output control section 37, the TV monitor 38 and the speaker 39 correspond to the guide data storage means 3, the switch means 7, the display output means 8 and the voice output means 9 of FIG. 1, respectively, and the remaining sections (26 to 36) together constitute the guide output means 6.

Here will be summarized the operations of the overall system. First of all, when the system is started, the CD information storage section 30 issues the read instructions to read and store the CD information from each of the guiding CDs and thus prepares for the start of guidance. When the present position information is received from the present position tracing unit 22, the CD information storage section 30 refers to the CD information and issues a read instruction to read object data related to a predetermined area covering the present position, and stores it in the object data storage section 32. Then, the point object extracting section 31 extracts the point object data, excepting the "shown status" information, from the point object data stored in the object data storage section 32. From the point object data extracted by the object point extracting section 31, the object searching section 33 searches the object No. or the object to be the subject guidance, on the basis of the present position and the direction of advance.

With reference to the address of the object data stored in the object data storage section 32 on the basis of the object No., the guidance control section 35 issues the voice/picture data read instruction to the CD drive control section 27. In response to this read instruction, the compressed data for guide picture and voice is input from the guiding CD to the picture/voice outputting section 36. This picture/voice outputting section 36 receives the guide instruction from the guidance control section 35 to decode the compressed data for guide picture and voice to generate the guide picture signals for the TV monitor 38 and the guide voice signals for the speaker 39. At the same time, the picture/voice outputting section 36 feeds the guiding status signal to the guidance control section 35. When this guiding status signal is fed through the guidance control section 35 to the output control section 37, the picture signals to the TV monitor 38 are switched in 37 between the map picture signals from the present position tracing unit 22 and the guide picture signals from the picture/voice outputting section 36. The guide picture is replaced by a map picture in response to a map instruction from the remote-control receiving section 24. At the end of each guide unit, the guidance control section 35 is informed of the ending by the picture/voice outputting section 36. The "shown status" flag for the information thus presented is set in the "shown status" information processing section 34 by the guidance control section 35.

Figure 7:
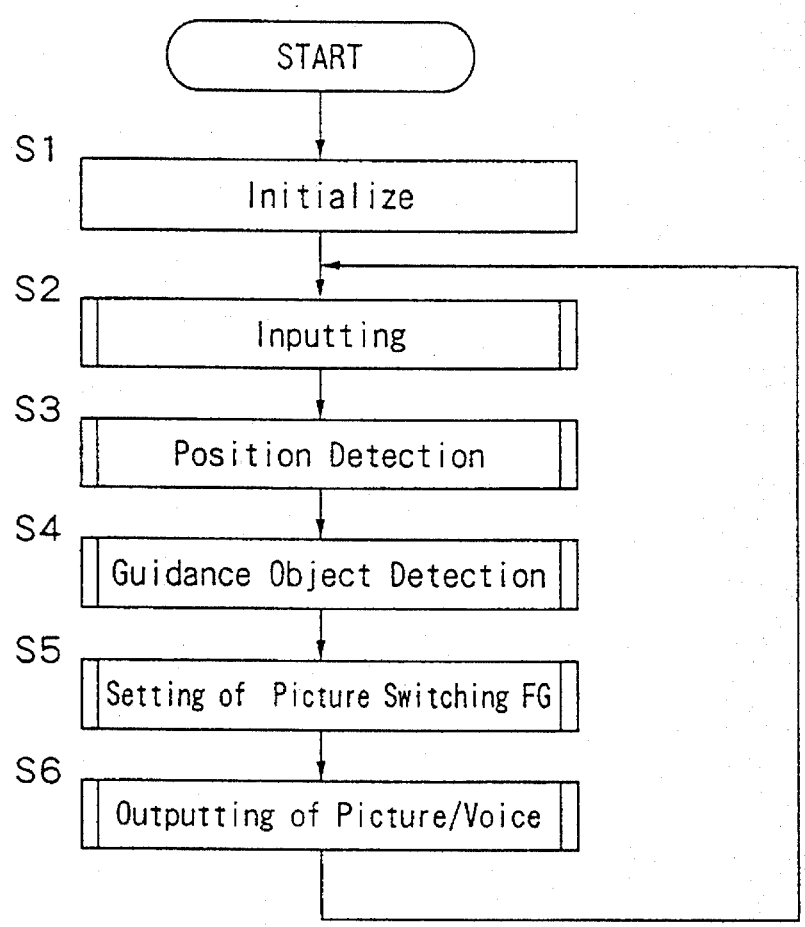
FIG. 7 is a flow chart for the basic routine for controlling the guide system.

Here will be described the routine for processing data to provide guidance information. As shown in FIG. 7, when the power is turned ON, the entire system is initialized (at Step S1). After this, the input signals coming from outside the system, e.g. from the remote control, are processed (at Step S2), and the present position is located and traced (at Step S3) by using the various sensors. A guidance object is then identified according to the present position. If a plurality of guidance objects are identified, it is decided which of the plural objects is to be the subject of guidance ("guidance object"), and identification of this guidance object is output (at Step S4). Along with this guide output, moreover, an FG for switching the guidance outputting picture is set (at Step S5). Then, the map picture and the picture/voice for the guidance object are output (at Step S6).

Figure 8:
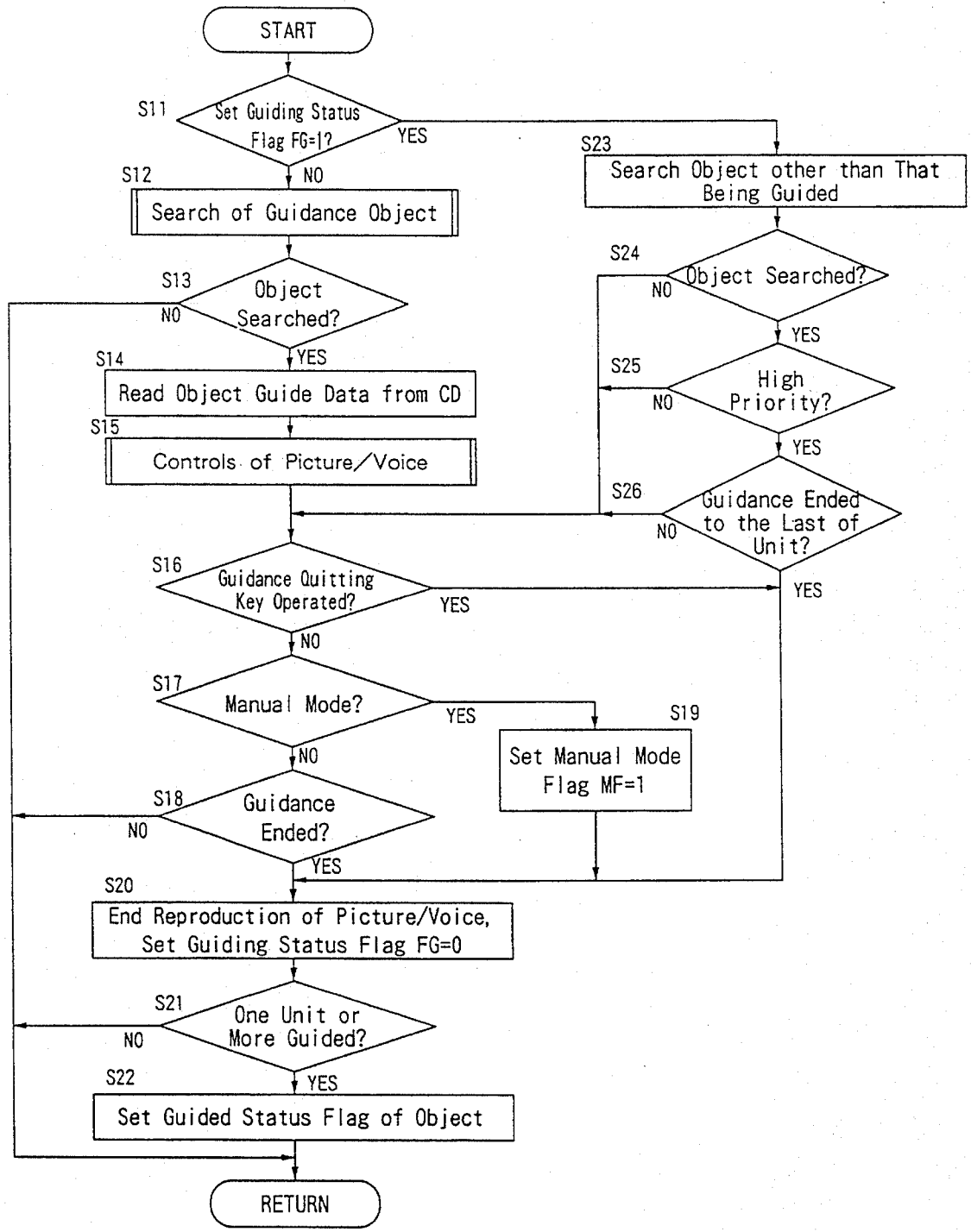
FIG. 8 is a flow chart of a routine for locating a guidance object.

The guidance object detecting routine of Step S4 is carried out, as shown in FIG. 8. First of all, it is examined (at Step S11) whether or not a "guiding status" ("shown status") flag FG is at "1". If the "guiding status" flag FG is at not "1", but at "0", the guidance object is searched (at Step S12). In short, it is decided in dependence upon the value "1" or "0" whether or not guidance for an object is currently being presented. If a guidance object is identified, its guide data are read from the CD, and the picture output signals, the voice output signals and the status signals are output to execute the picture/voice output controls and to thereby set the "guiding status" flag FG=1 and a "map picture switching mode" flag GDFG=1 (at Steps S13 to S15). After this, it is examined (at Steps S16 to S18) whether or not the guidance quitting key and the manual key have been operated and, if not, whether or not the guidance has ended.

Figure 9:
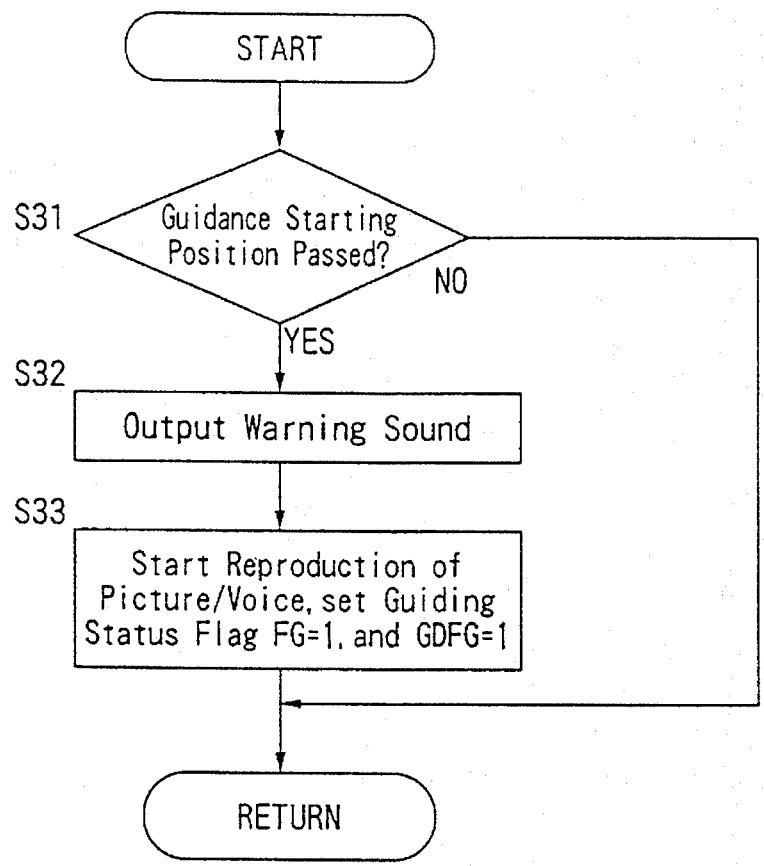
FIG. 9 is a flow chart of a routine for controlling the picture/voice outputs.

In the picture/voice output controls of Step S15, as shown in FIG. 9, it is examined (at Step S31), on the basis of the detected present position, whether or not the guidance starting position has been passed. If the guidance starting position has been passed, the guide output means 6 outputs the start voice signal to output a warning sound such as "Porn" (at Step S32). The picture signals, the voice signals and the status signals are then output from the guide output means 6. These output voice signals are converted into voice guidance by the voice output means 9, and the map picture display signals are converted into the picture signals by the switch means 7 in accordance with the status signal so that the guide picture is shown at the display output means 8. Here, the "guiding status" flag FG=1, and the "map picture switching mode" flag GDFG=1 (at Step S33).

If it is decided at Step S11 that the "guiding status" flag FG is at "1", an object other than that currently the subject of guidance is searched (at Step S23). If located (identified), it is examined (at Steps S24 and S25) to determine whether or not its priority is higher than that of the object currently the subject of guidance. If this answer is YES, the guidance is ended (at Step S26) as to the current guide unit, and the operations at and after Step S20 are executed.

If it is judged at the aforementioned Step S16 that the guide quit key has been operated, if it is judged at Step S17 that the manual mode has been chosen by operation of the manual key to set the "manual mode" flag MF=1 (at Step S19), if it is judged at Step S18 that the guidance has ended, or if it is judged at Step S26 that the guidance has ended through the last of the guide units for the current guidance object, the output of picture and voice are instantly ended, and the "guiding status" flag is set to FG=O (at Step S20). If, at this time, one guide unit or more has already been presented, the "guided status" flag for that object is set (at Steps S21 and S22).

Figure 10A:
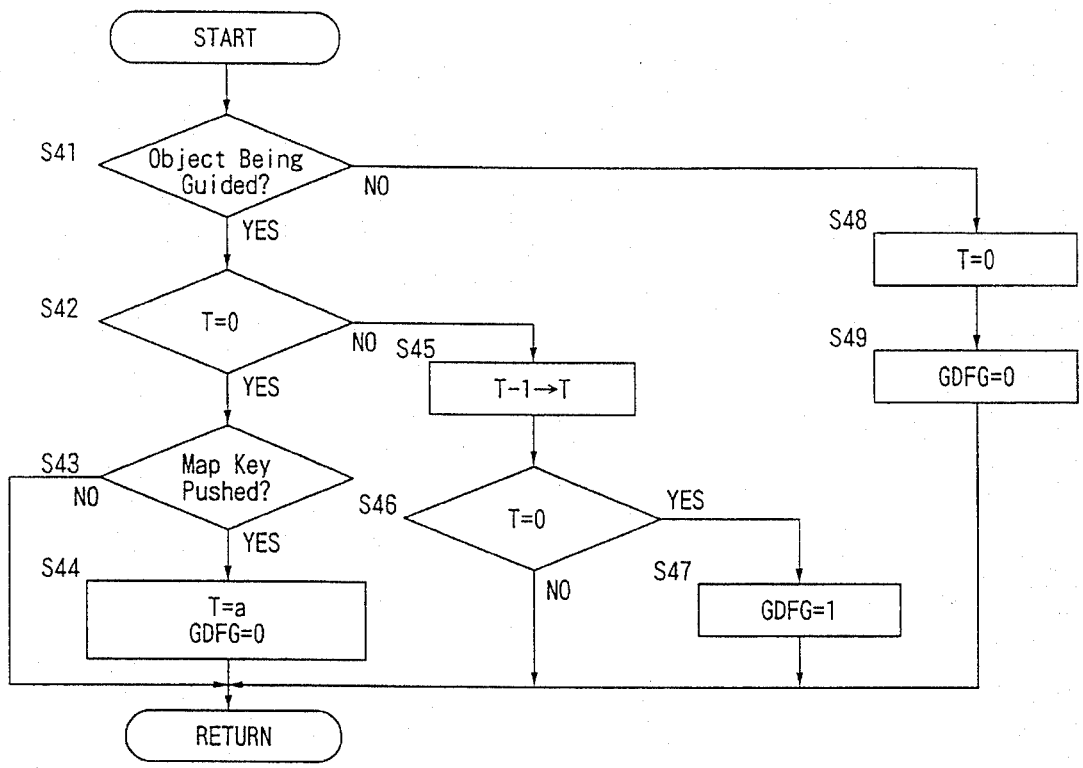
FIGS. 10(a) and 10(b) are flow charts for picture switching FG routines.

In the picture switching FG routine of Step S5, as shown in FIG. 10a, it is first determined (at Step S41) whether or not guidance is currently being presented. If this answer is NO, the time period is set to T=O, and the "map picture switching mode" flag is set to GDFG=O (at Steps S48 and S49). If the answer is YES, it is further examined (at Step S42) whether or not T=O. If T=O, a determination is made (at Step S43) whether or not the map key has been pushed (according to the map instruction). If this answer is YES, the routine is returned after setting the time to T=a and the "map picture switching mode" flag to GDFG=O (at Step S44). If the map key has not been pushed, on the other hand, the routine is returned as is. Unless T=O at Step S42, T−1→T (at Step S45), the determination is repeated (at Step S46) whether or not T=O. Then, the routine is returned for T=O by setting the "map picture switching mode" flag to GDFG=1 (at Step S47) but directly for T≠O. Thus, in case the map key has been operated (ON), the picture is switched by setting the flag GDFG=O, so that the object guide picture is restored after a constant period of time from T=a to T=O.

Figure 10B:
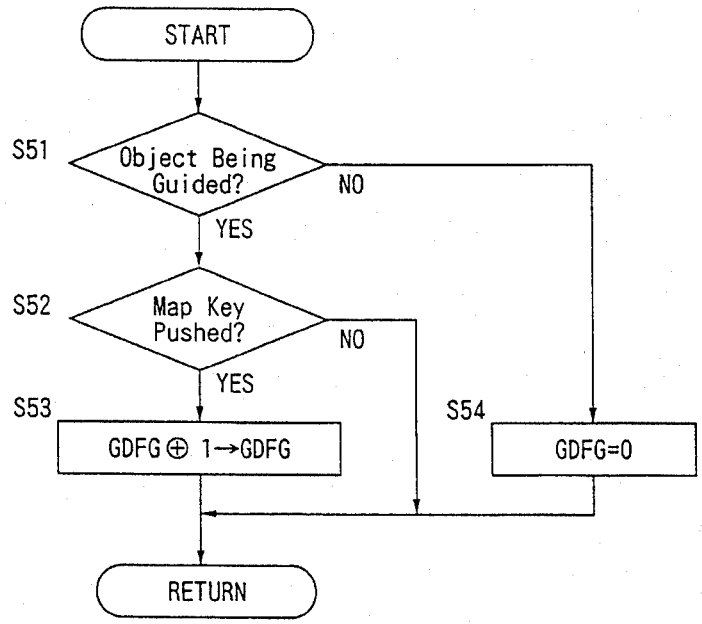

The picture may also be switched in response to each depression of the map key. In this case, as shown in FIG. 10b, it is examined (at Step S51) whether or not guidance for an object is currently presented and (at Step S52) whether or not the map key has been pushed (according to the map instruction). If there is no current guidance, the "map picture switching mode" flag is set to GDFG=O (at Step S54). If the map key is not pushed during the guidance, the routine is returned as is. Each time the map key is depressed, an exclusive OR is taken (at Step S53) between the flag GDFG and the value "1" to update the flag GDFG so that the flag GDFG is inverted to switch the picture. In any event, the guide system according to the present invention is able to switch to the map picture at any time the present position is to be confirmed during guidance.

Figure 11A:
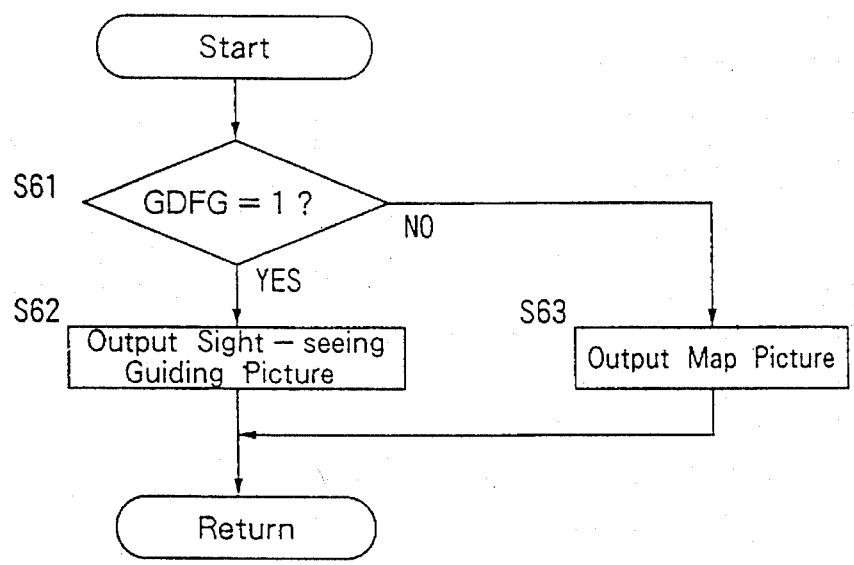
FIGS. 11(a) and 11(b) are flow charts for picture/voice outputting routines.
Figure 11B:
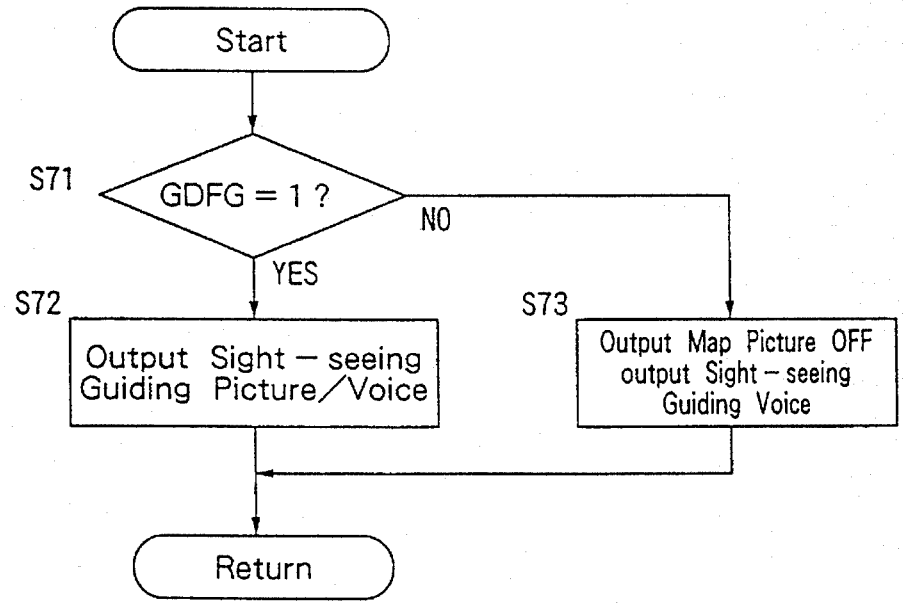

In the picture/voice outputting routine of Step S6, as shown in FIG. 11a, a determination is made at first (at Step S61) whether or not the "map picture switching mode" flag is GDFG=1. If GDFG=1, a sight-seeing guide picture is output (at Step S62). If GDFG≠1, the map picture is output (at Step S63). In short, only the picture is switched depending upon whether or not the "map picture switching mode flag" is GDFG=1. In addition to this picture switching the voice output may be terminated. In this case, as shown in FIG. 11b, it is examined (at Step S71) whether or not the "map picture switching mode" flag is GDFG=1. If GDFG=1, the sight-seeing guide picture and the voice are output (at Step S72). If GDFG≠1, the map picture is output, and the sight-seeing guide voice is turned OFF (at Step S73).

Figure 12:
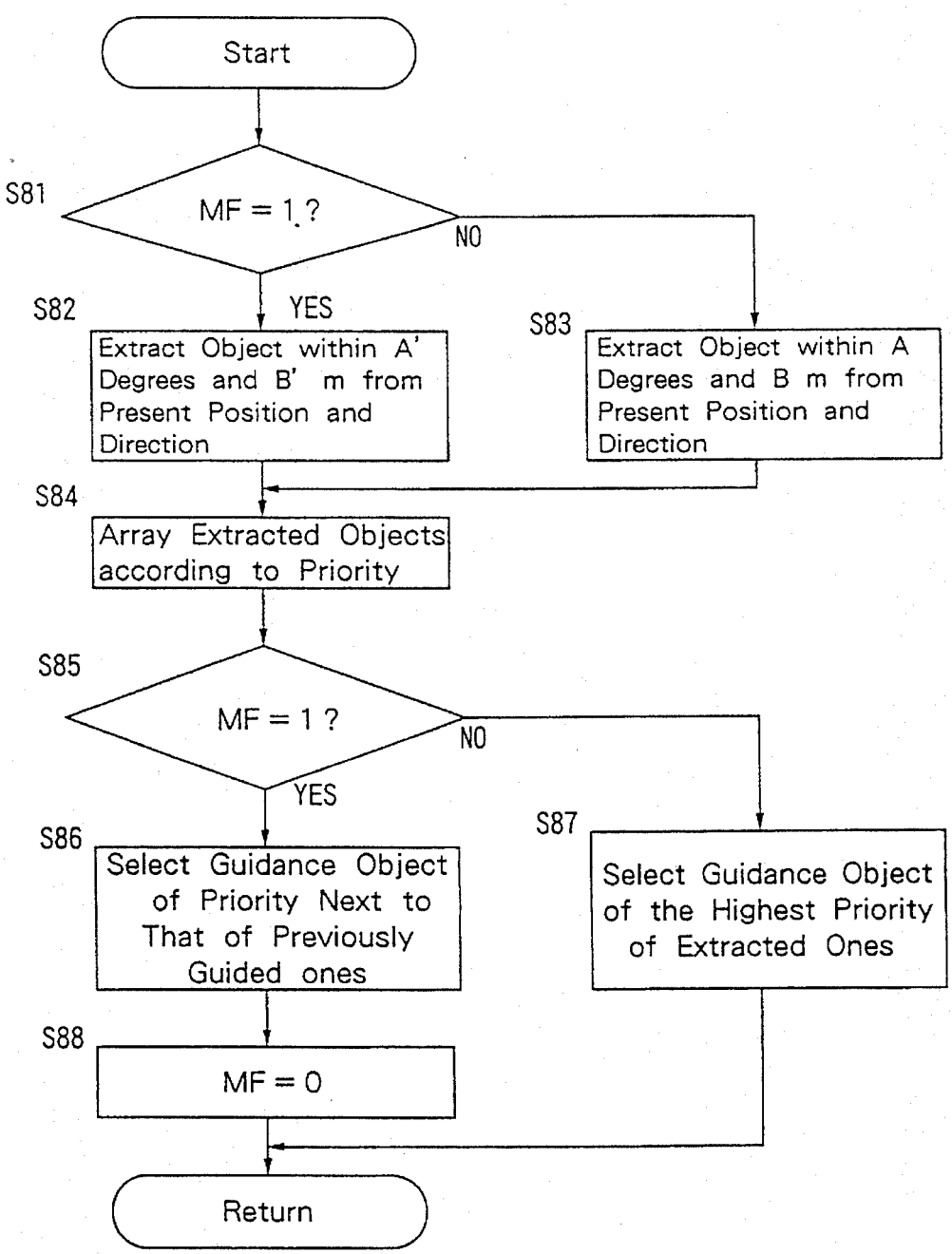
FIG. 12 is a flow chart for a guidance object searching routine.

In the guidance object searching routine of Step S12, as shown in FIG. 12, it is first determined (at Step S81) whether or not the "manual mode" flag is MF="1". If the "manual mode" flag MF is at "O", an object satisfying the conditions of within an angle ±A° from the direction of advance as shown in FIG. 2a and within B m as described in FIG. 2b, is identified (at Step S83) with reference to the present position, vehicle direction and vehicle speed. If the "manual mode" flag MF is at "1", a wider range defined by ±A' degrees and B' m is searched (at Step S82). The objects identified as satisfying the conditions are arrayed (at Step S84) according to their priorities. If the "manual mode" flag is MF="1", the object having a priority next to that of the previously presented object is selected as the guidance object, and the "manual mode" flag MF is set to "O". If MF="O", the object having the highest priority is selected as the guidance object.

In the aforementioned routine of identifying and outputting information for the guidance objects on the basis of priority, the items of object data stored in advance in the guiding CD are individually given priority so that they can be extracted by object No. and output for the guidance, from among the point data searched by the object searching section 33, according to the priority.

Moreover, the objects located by search on the basis of the present position and the distance from the present position are individually identified so that the objects located at a shorter distance may be preferentially output for the guidance. If, in this case, a plurality of guidance objects 1, 2, 3 and 4 are searched and extracted for the present position of the vehicle, for example, individual distances $d_1$, $d_2$, $d_3$ and $d_4$ to those guidance objects are determined. If the comparison of those distances reveals that $d_4<d_1<d_3<d_2$, the data for guidance object 4 is first extracted and output as guidance information, followed by output for guidance object 1, output for guidance object 3 and output for guidance object 2, in the recited order. Incidentally, the distance from the present position to an object can be calculated from the present position and the positional coordinates of the guidance object such as the coordinates of east longitude and north latitude. Of the objects identified by search on the basis of the present position, moreover, the guidance object having the shortest distance from the present position may be selected at first, and the distance from this guidance object to each of the other identified objects may be determined so that information for the identified objects may be output sequentially beginning with the shortest distance. If, in this case, the guidance objects 1, 2, 3 and 4 are identified with respect to the present position of the vehicle, as described above, the distances $d_1$, $d_2$, $d_3$ and $d_4$ to the individual guidance objects are first determined. If the comparison of those distances reveals that $d_4<d_1<d_3<d_2$, information for the guidance object 4 is first output. Next, the distances $d_{41}$, $d_{42}$ and $d_{43}$ from the guidance object 4 to the guidance objects 1, 2 and 3 are determined. If the result reveals that $d_{41}<d_{43}<d_{42}$, information for the guidance object 1 output. Likewise, if the distances $d_{12}$ and $d_{13}$ from the guidance object 1 to the guidance objects 2 and 3 are determined to reveal that $d_{12}<d_{13}$, information for object 2 is output, and information for the guidance object 3 is lastly output.

The wireless remote control is exemplified by the keypad shown in FIG. 13. In FIG. 13: the start/stop key is used to start the program stored in the CD-ROM from the state in which the title picture is displayed, and to stop the program when the map picture is displayed; and the south/north key is used to invert south-north orientation of a map when the map picture is displayed. The map picture is displayed with north directed upward in the case where the advancing direction is to the north. When the advancing direction is to the south, it is directed downward in the display. Thus, the south/north key is used to invert the map picture upward to the south or vice versa. A manual key is operated to start the guidance for a manually designated object, if any, while the map picture or the guide picture is being displayed, and to start the guidance for the next candidate guidance object during the manually designated. A detail key and a wide range key are operated to switch the scale of reduction of the map picture and to display the reduction scale. A set key is operated to effect the initialization and correct the present position on the map picture. A quit key is operated to terminate the guidance and to restore the map picture in both automatic guidance and manually designated guidance and to quit the initialization and the correction of the present position in the course of operations. Arrow keys are operated to move the present position cursor shown on the map picture for correction thereof. A map key is operated, to switch the display from the guide picture to the map picture, i.e. to issue a map instruction.

Figure 14:
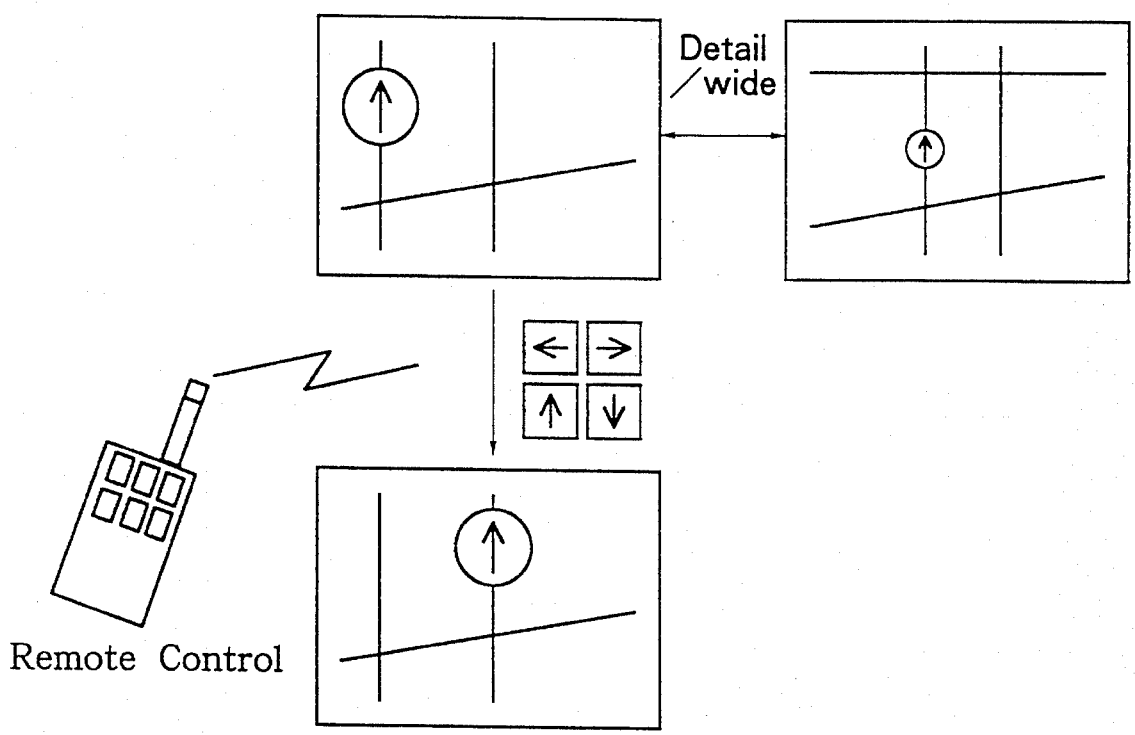
FIG. 14 is a diagram explaining the setting of a present position.

In case the memory is erased due to the initialization or the removal of the battery so that the present position is no longer stored in memory, it is necessary to set the present position. For setting present position in this case, as shown in FIG. 14, the arrow keys, the detail key, and the wide key are operated to shift the present position on the map picture, and this present position is set by operation of the set key.

Figure 15:
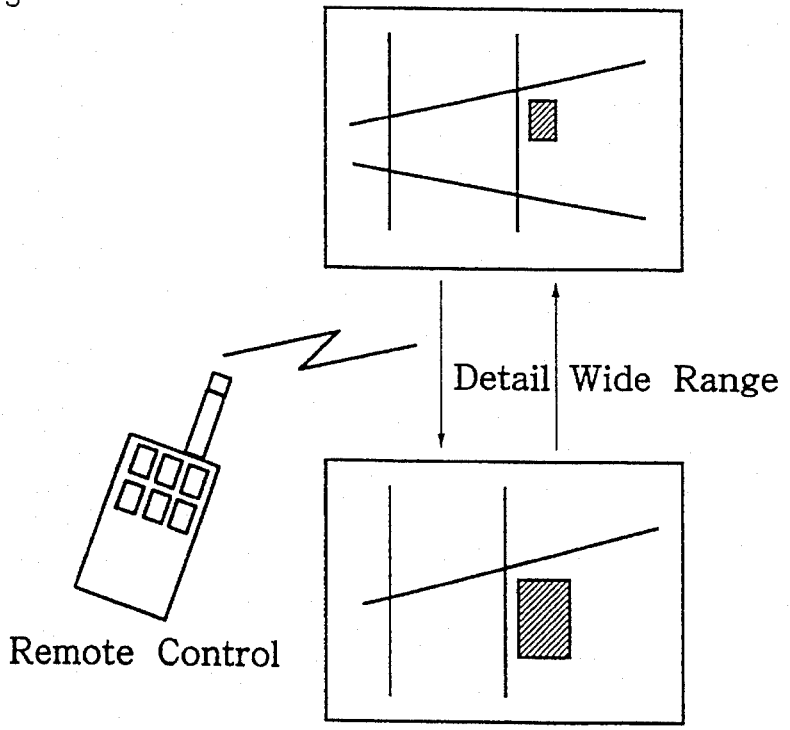
FIG. 15 is a diagram explaining the switching of the scale of a map picture.
Figure 16:
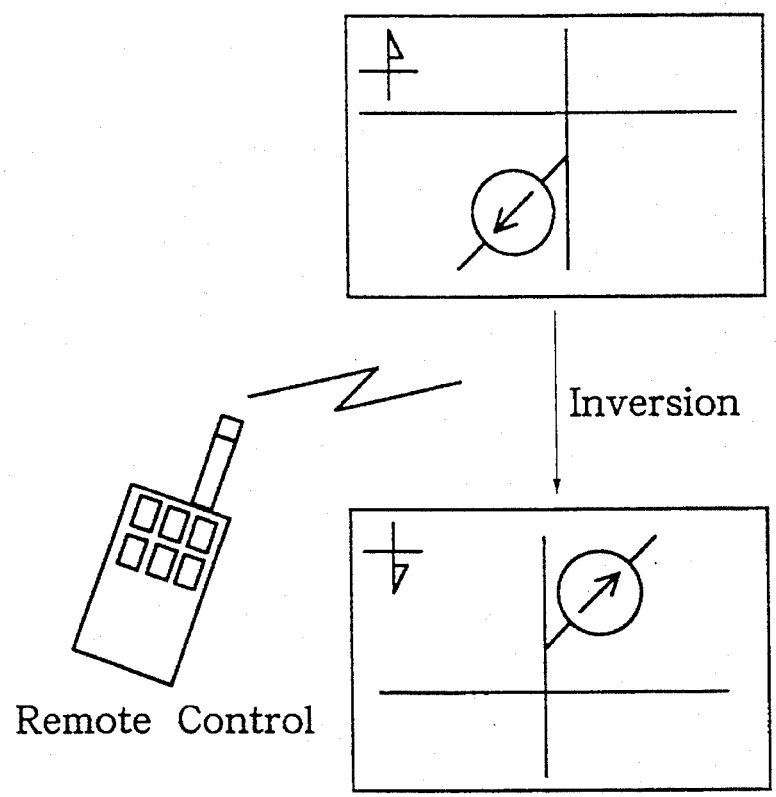
FIG. 16 is a diagram illustrating switching of the north/south orientation of the map picture.
Figure 17:
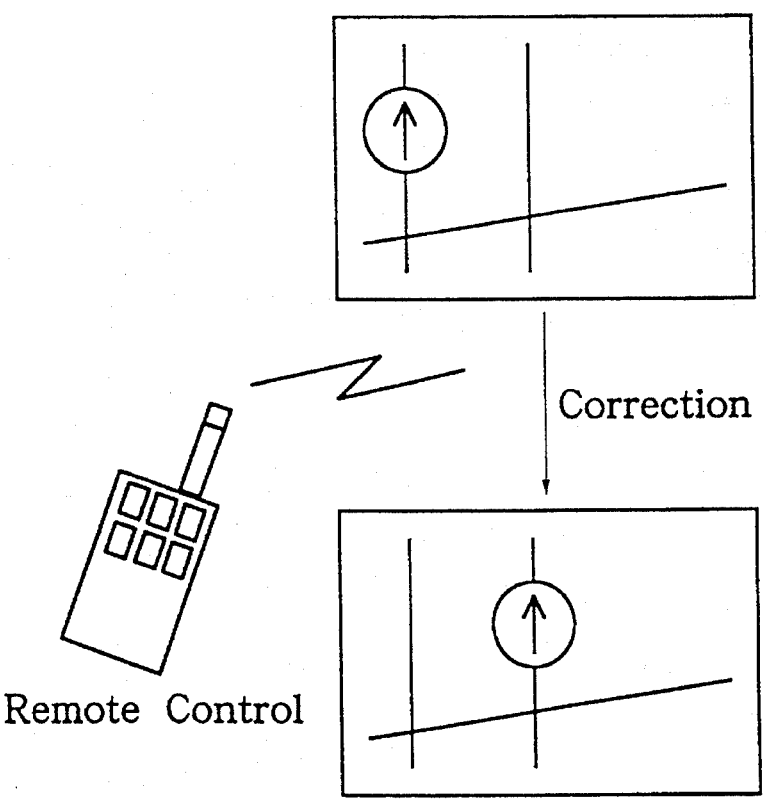
FIG. 17 is a diagram illustrating correction of the present position.

In the automatic guide mode, the map picture is displayed if no guidance object is present in the neighborhood and none is the subject of guidance, as described before. Even in this case, search for a guidance object is ongoing. However, the reduction scale of the map picture can be changed by operating the detail key and the wide range key, as shown in FIG. 15; the south/north direction of the map picture can be inverted by operating the south/north key, as shown in FIG. 16; and the present position of the vehicle can be corrected by operating the set key, the correction key and the arrow keys, as shown in FIG. 17.

Figure 18:
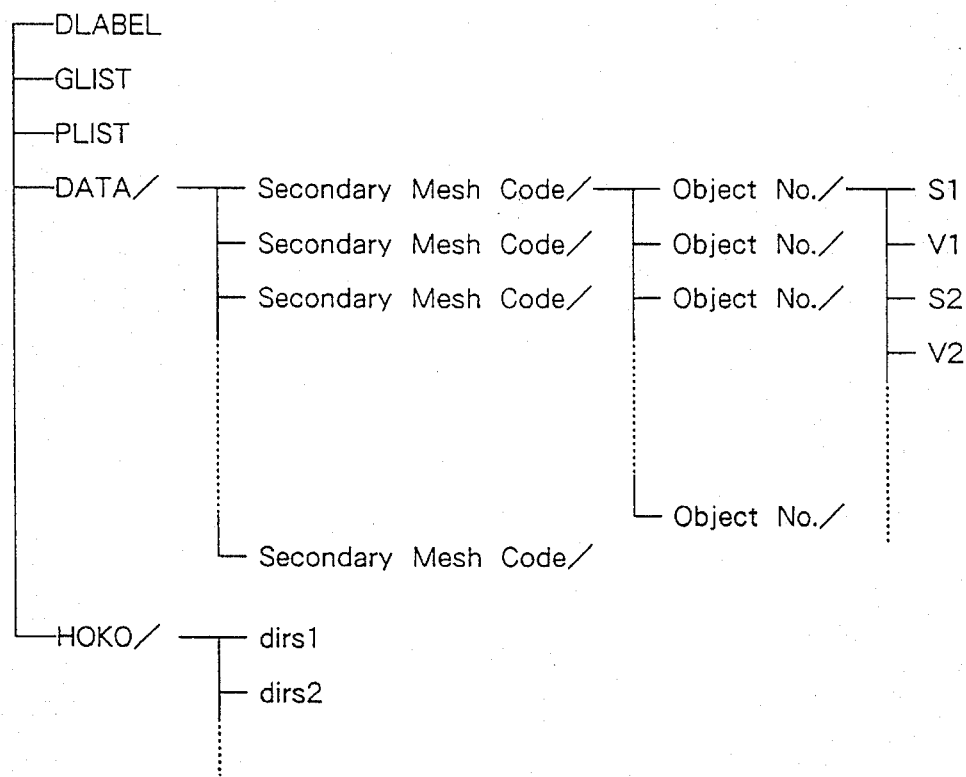
FIG. 18 is a diagram showing an example of the file structure of a guiding CD.

FIG. 18 is a diagram showing an example of the file structure stored within a guiding CD. This file structure for the guiding CD is composed, as exemplified in FIG. 18, of a disc label header DLABEL, a guidance object file GLIST, a guide point file PLIST, guide data DATA and direction data HOKO, and includes a plurality of CDs. The disc label header DLABEL is composed of disc label attribute data and an application area table (in east longitude and north latitude) stored in the discs, so that whether or not the present position is within the application area of the discs can be decided. The guidance object file GLIST has a guidance object data table, which is composed of a guidance object No., object attribute (designation as point object, linear object or the zone object, and the information as to the width in the case of a point object), the number of guidance starting points, the guide unit attribute (the voice/picture, and the information of length of the unit of the voice output), the object name, the secondary grid No. for the object position, and the object position (in east longitude and north latitude). The guide point file PLIST has a table of the guide point data composed of the point attribute, the point position (in east longitude and north latitude), the advancing azimuth and direction, and the voice No.

Figure 19:
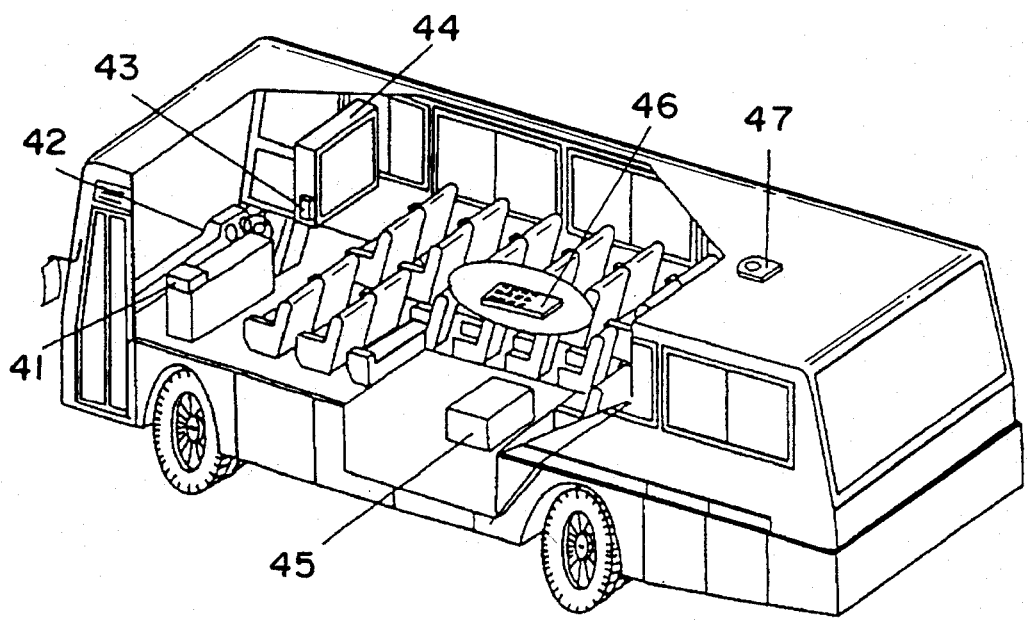
FIG. 19 is a view of a vehicle carrying the guide system of the present invention.

FIG. 19 is an exterior view of a vehicle carrying the guide system of the present invention. Reference numeral 41 designates a guide output unit; numeral 42 a vehicle speed sensor; numeral 43 a remote-control sensor; numeral 44 a monitor TV; numeral 45 a present position tracing unit; numeral 46 a remote control; and numeral 47 a GPS antenna. In this example, the guide system is applied to a sight-seeing bus which is equipped with the remote control 46 and the guide output unit 41, the monitor TV 44 and the remote-control sensor 43 at the back of the driver's seat, so that the passengers are able to switch between the sight-seeing guide picture and the map picture by operating the remote control 46.

Figure 20:
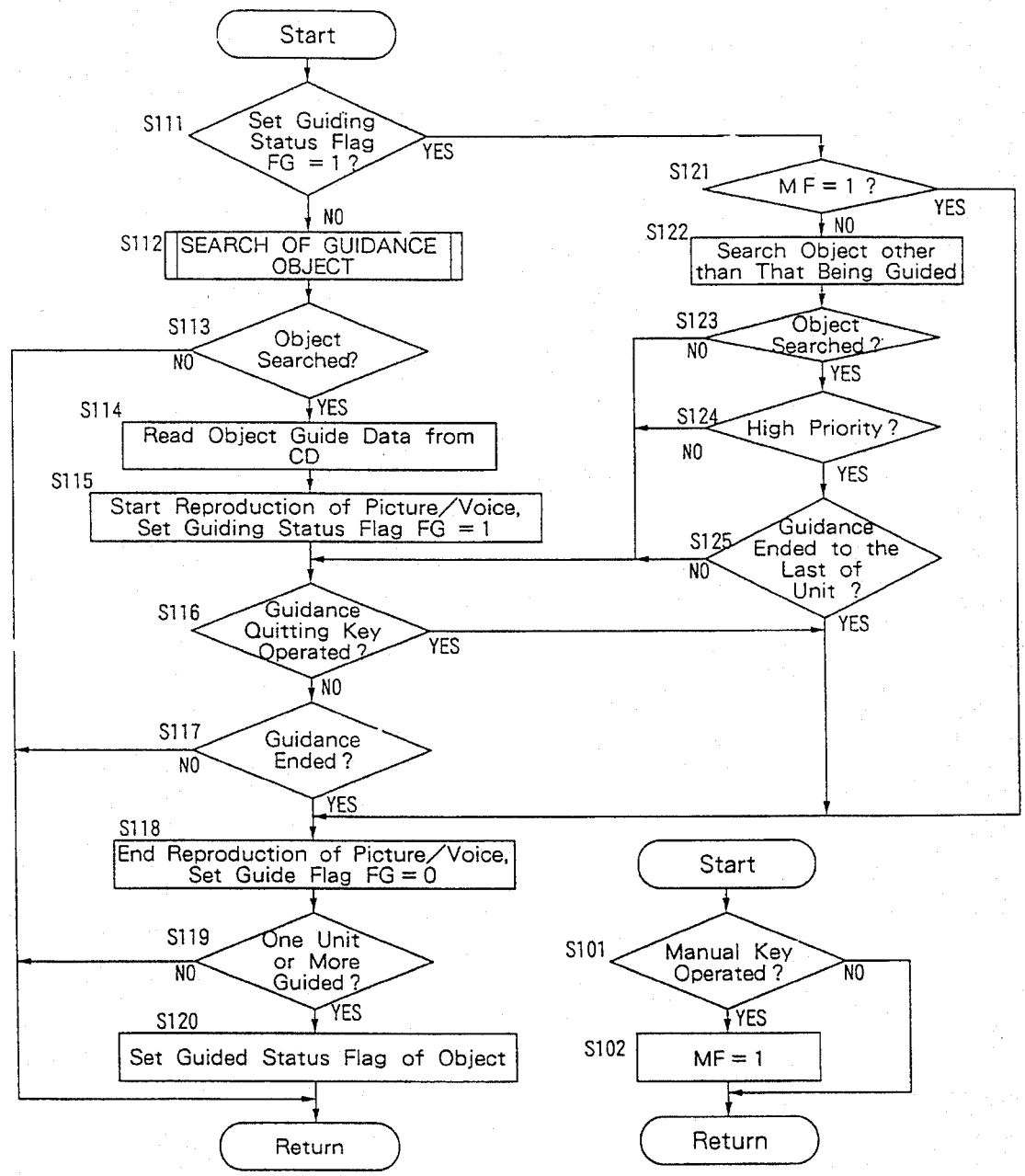
FIG. 20 is a flow chart for the routine for setting a "guided status" (or "shown status") flag.

In the routine, as described with reference to FIG. 8, the mode cannot be switched to the manual designation except under the predetermined conditions, even if the manual key is operated. Therefore, another embodiment of the present invention, in which the manual mode can be executed at all times by operating the manual key, is shown in FIG. 20. The operation of the manual key in this case is always monitored (at Step S101), as shown in FIG. 20, and the "manual mode" flag MF is set to "1" (at Step S102) if the monitor reveals operation of the manual key. In the object searching/guiding step, moreover, the "guiding status" flag FG, to be set to "1" during guidance, is first examined (at Step S111). If the "guiding status" flag FG is not at "1", search for a guidance object is initiated (at Step S112). If the answer at S111 is YES, the guide data for the object is read from the CD to start the picture and voice guidance, and the "guiding status" flag FG is set to "1" (at Steps S113 to S115). After this, it is determined whether or not the guidance quit key has been operated, and if not, it is determined whether or not the guidance has ended (at Steps S116 and S117).

If the "guiding status" flag FG is at "1", it is determined (at Step S121) whether or not the "manual mode" flag MF is at "1". If this "manual mode" flag MF is at "1", the output of the picture and voice is terminated, and the "guiding status" flag FG is reset to "O" (at Step S118). If, however, the "manual mode" flag MF is at "O", an object other than the current guidance object is searched for (at Step S122). If located, it is examined whether or not the newly identified object has a higher priority than that which is currently the subject of guidance (at Steps S123 and S124). If this answer is YES, the guidance is ended (at Step S125) at the end of the guide unit for the current guidance object, and the subsequent Step S118 and so on are executed.

If it is judged at the aforementioned Step S116 that the guide quit key has been operated, if it is judged at Step S117 that the guidance is ended, if it is judged at Step S121 that the "manual mode" flag MF is set to "1", or if it is judged at Step S125 that the guidance has completed the last of the guide units for the current guidance object, the output of the picture and voice is quickly ended and the "guiding status" flag FG reset to "O" (at Step S118). If, at this time, one or more guide units have been output, the "guided status" flag for the object is set (at Steps S119 and S120).

Figure 21:
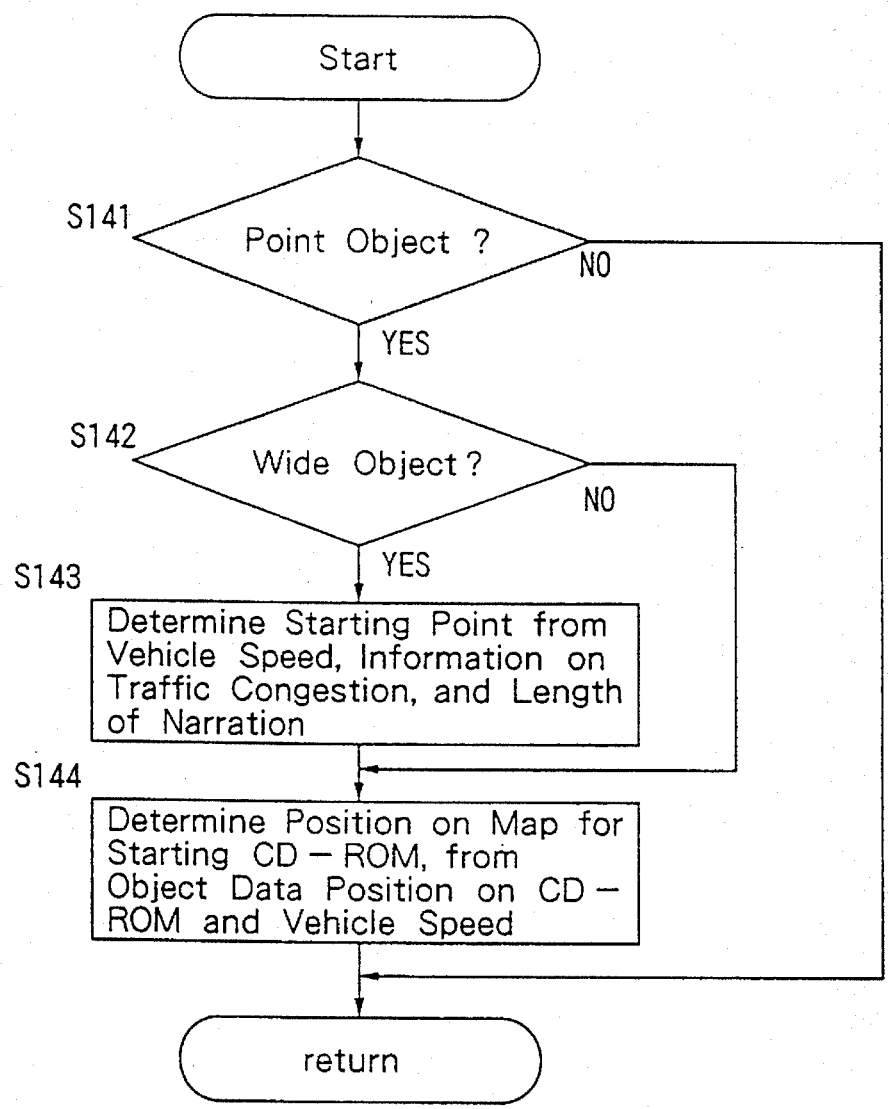
FIG. 21 is a flow chart for the routine for determining timing for start of object guidance.
Figure 22A:
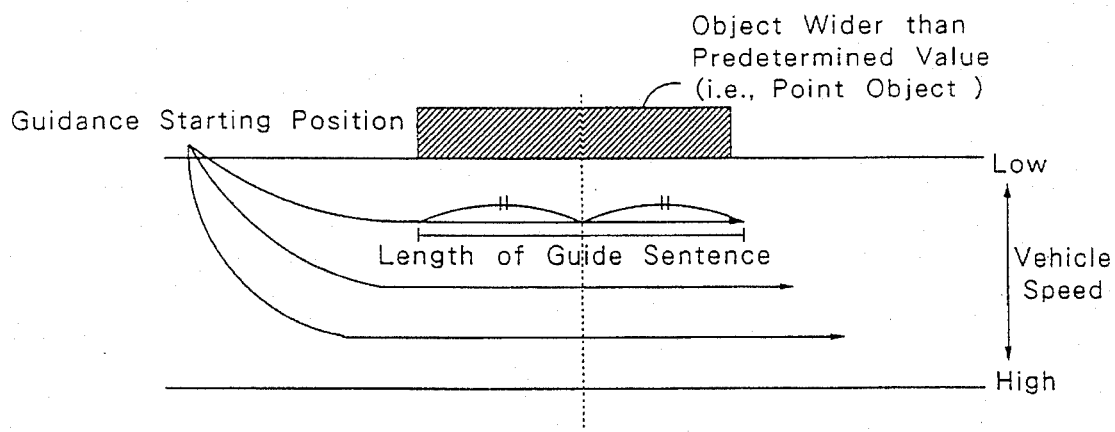
FIGS. 22(a), 22(b) and 22(c) are diagrams illustrating relationship between location of an object and the location of the vehicle at the start of guidance pertaining to that object.

The routine of calculating the timing of start of object guidance starts with examination (at Steps S141 and S142) of whether the object (attribute) as a point object or a point object having a designated width, as shown in FIG. 21. Here, an object having a predetermined width or more is designated as a wide (point) object whereas an object having a lesser width is designated as merely a point object (having a small width). In the case of a wide point object, as shown in FIG. 22a, the guidance starting position is changed to align the center of narration of the guidance output with the center of the guidance object (e.g., the center point of the portion of the guidance object facing the road). First of all, a distance s to be covered by the vehicle from the start to the end of the narration is determined as $s=v \cdot t$ from the length (t) of the narration, and the guidance starting point is determined as s/2 in advance of the center of the guidance object (at Step S143).

Figure 22B:
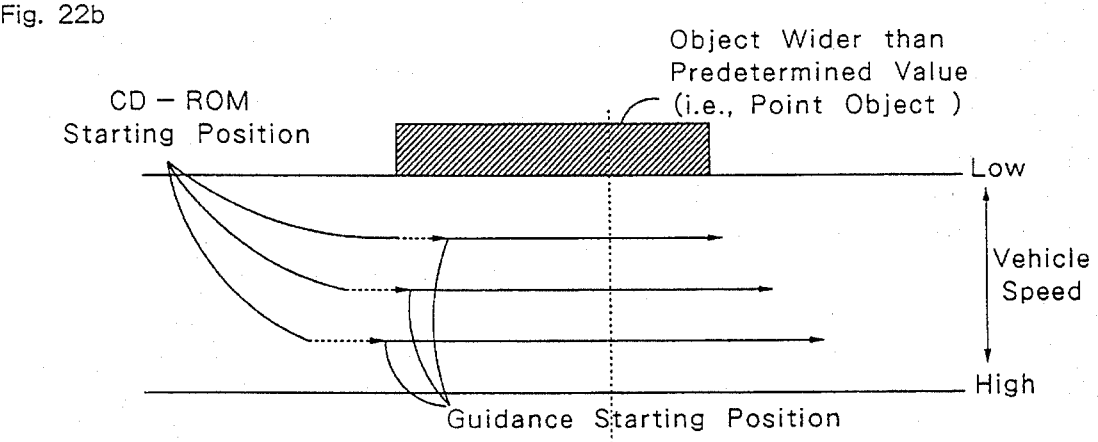

On the other hand, since it takes a long time to read the CD-ROM after the CD-ROM has been started, the guidance starting point may be advanced further, especially when the vehicle speed is high. Therefore, to set the guidance starting point, as described above in FIG. 22b, the position on the map for starting the CD-ROM is calculated (at Step S144) from the object data position on the CD-RDM and the vehicle speed.

Figure 22C:
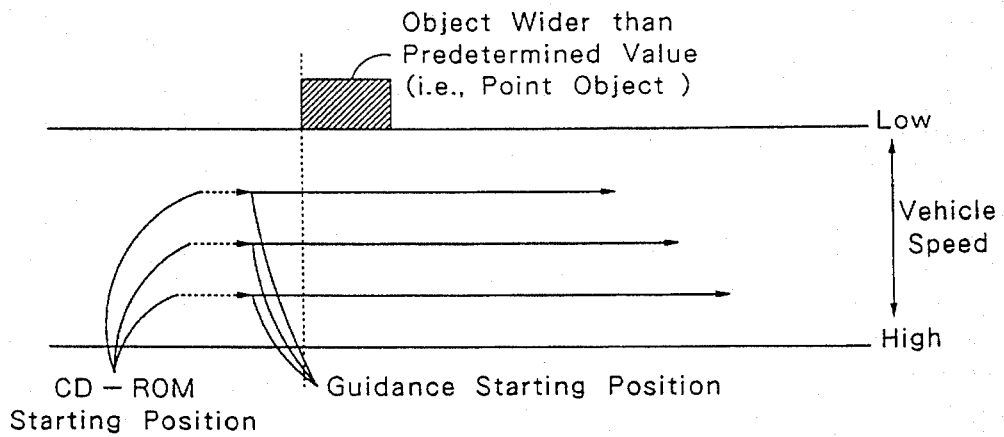

For a point object having a width less than the predetermined value, the guidance starting position is fixed, as shown in FIG. 22c, and the position on the map for starting the CD-ROM is calculated (at Step S144) from the object data position on the CD-ROM and the vehicle speed.

As has been described hereinbefore, according to the present invention, a sight-seeing object is searched, as the vehicle travels, within the ranges of predetermined angle and distance on the basis of the present position of the vehicle. Moreover, when no sight-seeing object is located by search under the predetermined conditions during travel of the vehicle, the manual key may be operated to change the search range in terms of the predetermined angle and distance. As a result, an object, which could not be located within the initial searching ranges, may be located by changing the searching ranges. If the searching ranges for the present position of the vehicle are identical for the outbound and return routes and if the same course is taken outbound and return, for example, the searches for the outbound and return routes will probably locate the same objects and provide the same guidance. However, when different guidance is desired on the return route, the manual key is operated to change the search ranges. Then, the objects different from those treated outbound can be located on the return route and different guidance provided so that the passengers can be satisfied. When a guidance object is located within the ordinary search ranges and is output as the subject of guidance, it may occur that the object cannot again be located by the automatic search for a long time or that the sight-seeing guidance for same is requested by a passenger. In this case, the search ranges may be changed to search for that guidance object by operating the manual keys so that the sight-seeing object can be located by search and extracted for guidance.

Incidentally, the present invention should not be limited to the foregoing embodiments but can be modified in various manners. In the foregoing embodiments, for example, the search ranges are initially within an advancing angle of ±A degrees and a distance of B m, and may be widened to the values ±A' degrees and B' m, when the manual keys are depressed; however, the searching conditions may be modified to select a guidance object specified by type. For example, the search conditions may be initially set to locate buildings such as temples but may be changed to locate another type of sight-seeing object of note, other than buildings, by operation of the manual keys. Alternatively, there may be added the condition under which the objects located ahead of the present position of the vehicle are exclusively located whereas the objects behind are excluded. In the foregoing embodiments, furthermore, the display screen may be switched for a predetermined time period to a map picture, by key operation, or the guide picture and the map picture may be alternately switched each time the keys are operated. In short, however, it is sufficient that the guide picture may be switched to a map at any time when the present position is to be confirmed during the guidance. In the case of switching to the map picture, furthermore, the voice guidance may be output as before, may be stopped or may be changed to provide information concerning the map picture.

In the foregoing embodiments, the width of the object is taken into account so that the guidance starting position for that object may be changed according to the vehicle speed. In the case where the guidance object is a building, however, the visibility of the guidance object from the road being followed may be influenced by the height of the building or by the density of other buildings around it and, therefore, the range of visibility of the guidance object may be taken into account in deciding the guidance starting point. Moreover, the stored information for the guidance object may include object type, e.g. classifications including buildings and natural landscape features such as mountains, rivers or lakes, with the object type taken into account in deciding the guidance starting point. This guidance starting point may also be changed according to road information such as traffic congestion.

What is claimed is:

1. A guide system for a vehicle comprising:
   guide data storage means for storing guide data for guidance objects located along roads to be travelled and the vicinity thereof;
   present position detecting a means for detecting present position;
   guide data output means including first search means for searching for guidance objects within a first range determined relative to said detected present position, second search means for searching for guidance objects within a second range determined relative to said detected present position, said second range being different from said first range, and read means for reading out of said guide data storage means guide data for a guidance object located by either of said first and second search means;
   a manual key for issuing an instruction for a search operation by said second search means, said first search means being operative to execute its search absent said instruction; and
   guidance output means for converting the guide data for said located guidance object into guidance information and for outputting said guidance information.

2. A guide system according to claim 1, wherein, when a plurality of guidance objects are located, said guidance output means displays a list of the plural located guidance objects and wherein said guide system further comprises selection means for selecting one of the listed guidance objects, said guidance output means outputting guidance information for the selected guidance object.

3. A guide system in accordance with claim 1 further comprising means for flagging guide data for said located guidance object as having been shown, responsive to output of guidance information for said located guidance object, and wherein said first and second search means ignore guidance objects flagged as having been shown in said searching.

4. A guide system in accordance with claim 1 wherein said guidance output means commences output of said guidance information at a point whereby said guidance information is centered on the guidance object and wherein said point is shifted forward as vehicle speed increases.

5. A guide system according to claim 1, wherein, when a plurality of guidance objects are located, said guide data output means assigns priority to the plural located guidance objects, and wherein said guidance output means outputs guidance information for that guidance object having the highest assigned priority among the plural located guidance objects.

6. A guide system according to claim 5, wherein said assigned priority is in accordance with priorities individually given to the guidance objects for which guide data is stored in said guide data storage means.

7. A guide system according to claim 5, wherein said priority assigned each of the plural located guidance objects is determined based on the distance of each located guidance object from the detected present position with that guidance object located at the shortest distance being assigned highest priority.

8. A guide system according to claim 5, wherein said guide data output means determines the distances from the detected present position to each of the plural located guidance objects and the distances between the plural located guidance objects, and wherein said guide data output means assigns highest priority to that guidance object located closest to the detected present position and then assigns priorities in sequence based on the distances between the guidance object assigned highest priority and the other of the plural located guidance objects.

9. A guide system in accordance with claim 5 wherein said guide data classifies each of said guidance objects as either a point object, a linear object or a zone object and wherein said guide data output means assigns highest priority to said point objects.

10. A guide system in accordance with claim 1 wherein said first search means determines said first range as a geographical area defined by an angle $\pm A°$ of the direction of vehicle advance with the apex of said angle being said detected present position and further defined by a distance B from said detected present position wherein A and B are predetermined values; and wherein said second search means determines said second range as a geographical area defined by an angle $\pm A'°$ of the direction of vehicle advance with the apex of said angle being said detected present position and further defined by a distance B' from said detected present position wherein A' and B' are predetermined values and wherein $A'°>A°$ and $B'>B$.

11. A guide system in accordance with claim 10 further comprising speed sensor means for detecting speed of the vehicle and wherein said first search means changes the value B and said second search means changes the value B', responsive to change in the detected vehicle speed.

12. A guide system for a vehicle comprising:
   guide data storage means for storing guide data for guidance objects located along roads to be travelled and the vicinity thereof;
   present position detecting means for detecting a present position;
   guide data output means including first search means for searching for guidance objects within a first range determined relative to said detected present position, second search means for searching for guidance objects within a second range determined relative to said detected present position, said second range being different from said first range, and read means for reading out of said guide data storage means guide data for a guidance object located by either of said first and second search means;

means for issuing an instruction for a search operation by said second search means when said first search means fails to locate a guidance object; and guidance output means for converting the guide data for said located guidance object into guidance information and for outputting said guidance information.

* * * * *

UNITED STATES PATENT AND TRADEMARK OFFICE
CERTIFICATE OF CORRECTION

PATENT NO. : 5,614,898
DATED : March 25, 1997
INVENTOR(S) : KAMIYA et al

It is certified that error appears in the above-indentified patent and that said Letters Patent is hereby corrected as shown below:

Col. 15, line 38, delete "a" and after "detecting", second instance, insert --a--.

Signed and Sealed this

Twelfth Day of May, 1998

Attest:

BRUCE LEHMAN

*Attesting Officer*          *Commissioner of Patents and Trademarks*